United States Patent
Tong et al.

(10) Patent No.: US 12,370,021 B2
(45) Date of Patent: *Jul. 29, 2025

(54) HYBRID ORTHODONTIC ARCHWIRES

(71) Applicant: Swift Health Systems Inc., Irvine, CA (US)

(72) Inventors: Hongsheng Tong, Yorba Linda, CA (US); Philong John Pham, Huntington Beach, CA (US); Allen Huynh, Irvine, CA (US); Robert Lee, Torrance, CA (US)

(73) Assignee: Swift Health Systems Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,863

(22) Filed: Mar. 14, 2024

(65) Prior Publication Data

US 2024/0358478 A1    Oct. 31, 2024

Related U.S. Application Data

(63) Continuation of application No. 17/105,085, filed on Nov. 25, 2020, now Pat. No. 11,957,536, which is a
(Continued)

(51) Int. Cl.
*A61C 7/20* (2006.01)
*A61C 7/28* (2006.01)

(52) U.S. Cl.
CPC . *A61C 7/28* (2013.01); *A61C 7/20* (2013.01)

(58) Field of Classification Search
CPC .... A61C 7/28; A61C 7/20; A61C 7/22; A61C 7/282
See application file for complete search history.

(56) References Cited

U.S. PATENT DOCUMENTS 1,005,131 A   10/1911 Angle et al.
1,108,493 A   8/1914 Federspiel
(Continued)

FOREIGN PATENT DOCUMENTS

CN       1372872    10/2002
CN      201079455    7/2008
(Continued)

OTHER PUBLICATIONS

Coro, Jorge C. et al., "MEAW Therapy" MEAW Therapy-Orthodontic Products, accessed via http://www.orthodonticproductsonline.com/2012/11/meaw-therapy/ on Mar. 14, 2016, dated as published Nov. 12, 2012 in 6 pages.
(Continued)

*Primary Examiner* — Ralph A Lewis
(74) *Attorney, Agent, or Firm* — Knobbe, Martens, Olson & Bear, LLP

(57) ABSTRACT

Hybrid orthodontic archwire designs are disclosed. Hybrid archwires may have bracket-archwire sections and interproximal archwire sections in which each section can vary in cross-section shape, size, and/or material properties. Bracket-archwire sections may be configured to promote torque control and may have rectangular cross-sections. Interproximal archwire sections may be configured to be bent into force-promoting loops and may have round cross sections. Each archwire section may be straight or bent into any shape. Hybrid archwires may have sliding sections and non-sliding sections. Non-sliding sections may have male connectors configured to prevent the archwire from sliding relative to the orthodontic brackets and/or may have cross-sectional shapes, sizes, or coatings that resist sliding relative to sliding sections. Sliding sections may have linear archwire segments. Hybrid archwires may have distal or poste-
(Continued)

rior non-sliding sections and an intermediate anterior or medial sliding section.

20 Claims, 5 Drawing Sheets

Related U.S. Application Data continuation of application No. 15/884,805, filed on Jan. 31, 2018, now Pat. No. 10,881,489.

(60) Provisional application No. 62/452,802, filed on Jan. 31, 2017.

(56) References Cited

U.S. PATENT DOCUMENTS

| | | | |
|---|---|---|---|
| 1,307,382 A | 6/1919 | Stanton | |
| 1,323,141 A | 11/1919 | Young | |
| 1,429,749 A | 9/1922 | Maeulen et al. | |
| 1,638,006 A | 2/1926 | Aderer | |
| 2,257,069 A | 9/1941 | Peak | |
| 2,495,692 A | 1/1950 | Brusse | |
| 2,524,763 A | 10/1950 | Brusse | |
| 2,582,230 A | 1/1952 | Brusse | |
| 3,256,602 A | 6/1966 | Broussard | |
| 3,262,207 A | 7/1966 | Kesling | |
| 3,374,542 A | 3/1968 | Moylan, Jr. | |
| 3,464,113 A | 9/1969 | Silverman et al. | |
| 3,593,421 A * | 7/1971 | Brader | A61C 7/20 433/21 |
| 3,600,808 A | 8/1971 | Reeve | |
| 3,683,502 A | 8/1972 | Wallshein | |
| 3,691,635 A | 9/1972 | Wallshein | |
| 3,762,050 A | 10/1973 | Dal Pont | |
| 3,765,091 A | 10/1973 | Northcutt | |
| 3,878,610 A | 4/1975 | Coscina | |
| 3,936,938 A | 2/1976 | Northcutt | |
| 3,946,488 A | 3/1976 | Miller et al. | |
| 3,949,477 A | 4/1976 | Cohen et al. | |
| 3,975,823 A | 8/1976 | Sosnay | |
| 4,052,792 A | 10/1977 | Biederman | |
| 4,103,423 A | 8/1978 | Kessel | |
| 4,171,568 A | 10/1979 | Forster | |
| 4,192,070 A | 3/1980 | Lemchen et al. | |
| 4,193,195 A | 3/1980 | Merkel et al. | |
| 4,197,643 A | 4/1980 | Burstone et al. | |
| 4,268,250 A | 5/1981 | Reeve | |
| 4,330,273 A | 5/1982 | Kesling | |
| 4,354,833 A | 10/1982 | Fujita | |
| 4,354,834 A | 10/1982 | Wilson | |
| 4,382,781 A | 5/1983 | Grossman | |
| 4,385,890 A | 5/1983 | Klein | |
| 4,412,819 A * | 11/1983 | Cannon | A61C 7/20 433/20 |
| 4,416,627 A | 11/1983 | Beazley | |
| 4,424,033 A | 1/1984 | Wool | |
| 4,436,510 A | 3/1984 | Klein | |
| 4,479,779 A * | 10/1984 | Wool | A61C 7/20 433/20 |
| 4,483,674 A | 11/1984 | Schütz | |
| 4,490,112 A * | 12/1984 | Tanaka | A61C 7/20 433/20 |
| 4,501,554 A | 2/1985 | Hickham | |
| 4,516,938 A | 5/1985 | Hall | |
| 4,529,382 A | 7/1985 | Creekmore | |
| 4,533,320 A | 8/1985 | Piekarsky | |
| 4,561,844 A | 12/1985 | Bates | |
| 4,580,976 A | 4/1986 | O'Meara | |
| 4,582,487 A | 4/1986 | Creekmore | |
| 4,585,414 A | 4/1986 | Kottermann | |
| 4,592,725 A | 6/1986 | Goshgarian | |
| 4,634,662 A | 1/1987 | Rosenberg | |
| 4,656,860 A | 4/1987 | Orthuber et al. | |
| 4,659,310 A | 4/1987 | Kottermann | |
| 4,664,626 A | 5/1987 | Kesling | |
| 4,674,978 A | 6/1987 | Acevedo | |
| 4,676,747 A | 6/1987 | Kesling | |
| 4,725,229 A | 2/1988 | Miller | |
| 4,797,093 A | 1/1989 | Bergersen | |
| 4,797,095 A | 1/1989 | Armstrong et al. | |
| 4,838,787 A | 6/1989 | Lerner | |
| 4,842,512 A | 6/1989 | Kesling | |
| 4,842,514 A | 6/1989 | Kesling | |
| 4,872,449 A | 10/1989 | Beeuwkes | |
| 4,881,896 A | 11/1989 | Bergersen | |
| 4,892,479 A | 1/1990 | McKenna | |
| 4,897,035 A | 1/1990 | Green | |
| 4,900,251 A | 2/1990 | Andreasen | |
| 4,941,825 A | 7/1990 | Lerner | |
| 4,978,323 A | 12/1990 | Freedman | |
| 5,011,405 A | 4/1991 | Lemchen | |
| 5,017,133 A | 5/1991 | Miura | |
| 5,037,297 A | 8/1991 | Lerner | |
| 5,044,947 A | 9/1991 | Sachdeva et al. | |
| 5,055,039 A | 10/1991 | Abbatte et al. | |
| 5,092,768 A | 3/1992 | Korn | |
| 5,114,339 A | 5/1992 | Guis | |
| 5,123,838 A | 6/1992 | Cannon | |
| 5,127,828 A | 7/1992 | Suyama | |
| 5,131,843 A | 7/1992 | Hilgers et al. | |
| 5,154,606 A | 10/1992 | Wildman | |
| 5,174,754 A | 12/1992 | Meritt | |
| 5,176,514 A | 1/1993 | Viazis | |
| 5,176,618 A | 1/1993 | Freedman | |
| 5,238,404 A | 8/1993 | Andreiko | |
| 5,242,304 A | 9/1993 | Truax et al. | |
| 5,248,257 A | 9/1993 | Cannon | |
| 5,259,760 A | 11/1993 | Orikasa | |
| 5,312,247 A | 5/1994 | Sachdeva et al. | |
| 5,344,315 A | 9/1994 | Hanson | |
| 5,368,478 A | 11/1994 | Andreiko | |
| 5,380,197 A | 1/1995 | Hanson | |
| 5,399,087 A | 3/1995 | Arndt | |
| 5,431,562 A | 7/1995 | Andreiko | |
| 5,447,432 A | 9/1995 | Andreiko | |
| 5,454,717 A | 10/1995 | Andreiko | |
| RE35,169 E | 3/1996 | Lemchen et al. | |
| 5,516,284 A | 5/1996 | Wildman | |
| 5,556,277 A * | 9/1996 | Yawata | A61C 7/143 433/17 |
| 5,624,258 A | 4/1997 | Wool | |
| 5,630,715 A | 5/1997 | Voudouris | |
| 5,683,243 A | 11/1997 | Andreiko | |
| 5,683,245 A | 11/1997 | Sachdeva et al. | |
| 5,722,827 A | 3/1998 | Allesee | |
| 5,727,941 A * | 3/1998 | Kesling | A61C 7/282 433/17 |
| 5,816,800 A | 10/1998 | Brehm | |
| 5,820,370 A | 10/1998 | Brosius | |
| 5,863,198 A | 1/1999 | Doyle | |
| 5,890,893 A | 4/1999 | Heiser | |
| 5,971,754 A | 10/1999 | Sondhi et al. | |
| 5,975,893 A | 11/1999 | Chishti et al. | |
| 5,993,208 A | 11/1999 | Jonjic | |
| 6,015,289 A | 1/2000 | Andreiko | |
| 6,036,489 A | 3/2000 | Brosius | |
| 6,042,374 A | 3/2000 | Farzin-Nia et al. | |
| 6,086,364 A | 7/2000 | Brunson | |
| 6,089,861 A | 7/2000 | Kelly | |
| 6,095,809 A | 8/2000 | Kelly et al. | |
| 6,099,304 A | 8/2000 | Carter | |
| 6,123,544 A | 9/2000 | Cleary | |
| 6,183,250 B1 | 2/2001 | Kanno et al. | |
| 6,190,166 B1 | 2/2001 | Sasakura | |
| 6,196,839 B1 | 3/2001 | Ross | |
| 6,213,767 B1 | 4/2001 | Dixon et al. | |
| 6,217,325 B1 | 4/2001 | Chishti et al. | |
| 6,227,850 B1 | 5/2001 | Chishti et al. | |
| 6,244,861 B1 | 6/2001 | Andreiko | |
| 6,250,918 B1 | 6/2001 | Sachdeva et al. | |
| 6,258,118 B1 | 7/2001 | Baum et al. | |
| 6,315,553 B1 | 11/2001 | Sachdeva et al. | |
| 6,318,994 B1 | 11/2001 | Chishti et al. | |

(56) References Cited

U.S. PATENT DOCUMENTS

| | | |
|---|---|---|
| 6,318,995 B1 | 11/2001 | Sachdeva et al. |
| 6,334,853 B1 | 1/2002 | Kopelman et al. |
| 6,350,120 B1 | 2/2002 | Sachdeva et al. |
| 6,358,045 B1 | 3/2002 | Farzin-Nia et al. |
| 6,371,761 B1 | 4/2002 | Cheang et al. |
| 6,375,458 B1 | 4/2002 | Moorleghem et al. |
| 6,394,801 B2 | 5/2002 | Chishti et al. |
| 6,398,548 B1 | 6/2002 | Muhammad et al. |
| 6,413,084 B1 | 6/2002 | Rubbert et al. |
| 6,431,870 B1 | 8/2002 | Sachdeva |
| 6,450,807 B1 | 9/2002 | Chishti et al. |
| 6,464,495 B1 | 10/2002 | Voudouris |
| 6,464,496 B1 | 10/2002 | Sachdeva et al. |
| 6,471,511 B1 | 10/2002 | Chishti et al. |
| 6,471,512 B1 | 10/2002 | Sachdeva et al. |
| 6,512,994 B1 | 1/2003 | Sachdeva |
| 6,514,074 B1 | 2/2003 | Chishti et al. |
| 6,532,299 B1 | 3/2003 | Sachdeva et al. |
| 6,540,512 B1 | 4/2003 | Sachdeva et al. |
| 6,554,613 B1 | 4/2003 | Sachdeva et al. |
| 6,572,693 B1 | 6/2003 | Wu et al. |
| 6,582,226 B2 | 6/2003 | Jordan et al. |
| 6,587,828 B1 | 7/2003 | Sachdeva |
| 6,595,774 B1 | 7/2003 | Risse |
| 6,554,611 B2 | 8/2003 | Chishti et al. |
| 6,602,070 B2 | 8/2003 | Miller et al. |
| 6,612,143 B1 | 9/2003 | Butscher et al. |
| 6,616,444 B2 | 9/2003 | Andreiko |
| 6,626,666 B2 | 9/2003 | Chishti et al. |
| 6,629,840 B2 | 10/2003 | Chishti et al. |
| 6,632,089 B2 | 10/2003 | Rubbert |
| 6,648,640 B2 | 11/2003 | Rubbert |
| 6,663,385 B2 | 12/2003 | Tepper |
| 6,679,700 B2 | 1/2004 | McGann |
| 6,682,344 B1 | 1/2004 | Stockstill |
| 6,685,469 B2 | 2/2004 | Chishti et al. |
| 6,685,470 B2 | 2/2004 | Chishti et al. |
| 6,688,885 B1 | 2/2004 | Sachdeva et al. |
| 6,699,037 B2 | 3/2004 | Chishti et al. |
| 6,702,575 B2 | 3/2004 | Hilliard |
| 6,705,863 B2 | 3/2004 | Phan et al. |
| 6,722,878 B2 | 4/2004 | Graham |
| 6,722,880 B2 | 4/2004 | Chishti et al. |
| 6,728,423 B1 | 4/2004 | Rubbert et al. |
| 6,729,876 B2 | 5/2004 | Chishti et al. |
| 6,732,558 B2 | 5/2004 | Butscher et al. |
| 6,733,285 B2 | 5/2004 | Puttler et al. |
| 6,733,287 B2 | 5/2004 | Wilkerson |
| 6,733,288 B2 | 5/2004 | Vallittu et al. |
| 6,736,638 B1 | 5/2004 | Sachdeva et al. |
| 6,738,508 B1 | 5/2004 | Rubbert et al. |
| 6,739,869 B1 | 5/2004 | Taub et al. |
| 6,744,914 B1 | 6/2004 | Rubbert et al. |
| 6,744,932 B1 | 6/2004 | Rubbert et al. |
| 6,746,241 B2 | 6/2004 | Townsend-Hansen |
| 6,755,064 B2 | 6/2004 | Butscher |
| 6,771,809 B1 | 8/2004 | Rubbert et al. |
| 6,776,614 B2 | 8/2004 | Wiechmann |
| 6,811,397 B2 | 11/2004 | Wool |
| 6,830,450 B2 | 12/2004 | Knopp et al. |
| 6,845,175 B2 | 1/2005 | Kopelman et al. |
| 6,846,179 B2 | 1/2005 | Chapouland |
| 6,851,949 B1 | 2/2005 | Sachdeva et al. |
| 6,860,132 B2 | 3/2005 | Butscher |
| 6,893,257 B2 | 5/2005 | Kelly |
| 6,928,733 B2 | 8/2005 | Rubbert et al. |
| 6,948,931 B2 | 9/2005 | Chishti et al. |
| 6,960,079 B2 | 11/2005 | Brennan et al. |
| 6,971,873 B2 | 12/2005 | Sachdeva |
| 6,976,627 B1 | 12/2005 | Culp et al. |
| 6,988,889 B2 | 1/2006 | Abels |
| 6,996,452 B2 | 2/2006 | Erichsen et al. |
| 7,008,221 B2 | 3/2006 | McGann |
| 7,013,191 B2 | 3/2006 | Rubbert |
| 7,020,963 B2 | 4/2006 | Cleary et al. |
| 7,029,275 B2 | 4/2006 | Rubbert |
| 7,033,171 B2 | 4/2006 | Wilkerson |
| 7,037,107 B2 | 5/2006 | Yamamoto |
| 7,056,115 B2 | 6/2006 | Phan et al. |
| 7,063,531 B2 | 6/2006 | Maijer et al. |
| 7,068,836 B1 | 6/2006 | Rubbert et al. |
| 7,076,980 B2 | 7/2006 | Butscher |
| 7,077,646 B2 | 7/2006 | Hilliard |
| 7,077,647 B2 | 7/2006 | Choi et al. |
| 7,080,979 B2 | 7/2006 | Rubbert et al. |
| 7,092,107 B2 | 8/2006 | Babayoff et al. |
| 7,094,053 B2 | 8/2006 | Andreiko |
| 7,112,065 B2 | 9/2006 | Kopelman et al. |
| 7,125,248 B2 | 10/2006 | Phan et al. |
| 7,134,874 B2 | 11/2006 | Chishti et al. |
| 7,137,812 B2 | 11/2006 | Cleary et al. |
| 7,155,373 B2 | 12/2006 | Jordan et al. |
| 7,156,661 B2 | 1/2007 | Choi et al. |
| 7,160,110 B2 | 1/2007 | Imgrund et al. |
| 7,168,950 B2 | 1/2007 | Cinader, Jr. et al. |
| 7,172,417 B2 | 2/2007 | Sporbert et al. |
| 7,175,428 B2 | 2/2007 | Nicholson |
| 7,186,115 B2 | 3/2007 | Goldberg et al. |
| 7,188,421 B2 | 3/2007 | Cleary et al. |
| 7,201,574 B1 | 4/2007 | Wiley |
| 7,204,690 B2 | 4/2007 | Hanson et al. |
| 7,214,056 B2 | 5/2007 | Stockstill |
| 7,229,282 B2 | 6/2007 | Andreiko |
| 7,234,934 B2 | 6/2007 | Rosenberg |
| 7,234,936 B2 | 6/2007 | Lai |
| 7,234,937 B2 | 6/2007 | Sachdeva et al. |
| 7,240,528 B2 | 7/2007 | Weise et al. |
| 7,244,121 B2 | 7/2007 | Brosius |
| 7,245,977 B1 | 7/2007 | Simkins |
| 7,252,506 B2 * | 8/2007 | Lai .......................... A61C 7/20 433/20 |
| 7,267,545 B2 | 9/2007 | Oda |
| 7,283,891 B2 | 10/2007 | Butscher |
| 7,296,996 B2 | 11/2007 | Sachdeva |
| 7,335,021 B2 | 2/2008 | Nikodem |
| 7,347,688 B2 | 3/2008 | Kopelman et al. |
| 7,354,268 B2 | 4/2008 | Raby et al. |
| 7,357,634 B2 | 4/2008 | Knopp |
| 7,361,017 B2 | 4/2008 | Sachdeva |
| 7,364,428 B2 | 4/2008 | Cinader, Jr. et al. |
| 7,404,714 B2 | 7/2008 | Cleary et al. |
| 7,410,357 B2 | 8/2008 | Cleary et al. |
| 7,416,408 B2 | 8/2008 | Farzin-Nia et al. |
| 7,442,041 B2 | 10/2008 | Imgrund et al. |
| 7,452,205 B2 | 11/2008 | Cinader, Jr. et al. |
| 7,458,812 B2 | 12/2008 | Sporbert et al. |
| 7,469,783 B2 | 12/2008 | Rose, Sr. |
| 7,471,821 B2 | 12/2008 | Rubbert et al. |
| 7,473,097 B2 | 1/2009 | Raby et al. |
| 7,556,496 B2 | 7/2009 | Cinader, Jr. et al. |
| 7,578,673 B2 | 8/2009 | Wen et al. |
| 7,578,674 B2 | 8/2009 | Chishti et al. |
| 7,585,172 B2 | 9/2009 | Rubbert |
| 7,590,462 B2 | 9/2009 | Rubbert |
| 7,604,181 B2 | 10/2009 | Culp et al. |
| 7,621,743 B2 | 11/2009 | Bathen |
| 7,641,473 B2 | 1/2010 | Sporbert |
| 7,674,110 B2 | 3/2010 | Oda |
| 7,677,887 B2 | 3/2010 | Nicholson |
| 7,699,606 B2 | 4/2010 | Sachdeva et al. |
| 7,704,072 B2 | 4/2010 | Damon |
| 7,717,708 B2 | 5/2010 | Sachdeva |
| 7,722,354 B1 | 5/2010 | Dumas |
| 7,726,470 B2 | 6/2010 | Cinader, Jr. et al. |
| 7,726,968 B2 | 6/2010 | Raby et al. |
| 7,751,925 B2 | 7/2010 | Rubbert |
| 7,762,815 B2 | 7/2010 | Cinader, Jr. et al. |
| 7,811,087 B2 | 10/2010 | Wiechmann |
| 7,837,464 B2 | 11/2010 | Marshall |
| 7,837,466 B2 | 11/2010 | Griffith et al. |
| 7,837,467 B2 | 11/2010 | Butscher |
| 7,845,938 B2 | 12/2010 | Kim et al. |
| 7,850,451 B2 | 12/2010 | Wiechmann |
| 7,871,267 B2 | 1/2011 | Griffith et al. |

(56) References Cited

U.S. PATENT DOCUMENTS

| | | |
|---|---|---|
| 7,878,806 B2 | 2/2011 | Lemchen |
| 7,909,603 B2 | 3/2011 | Oda |
| D636,084 S | 4/2011 | Troester |
| D636,085 S | 4/2011 | Troester |
| 7,950,131 B2 | 5/2011 | Hilliard |
| 7,993,133 B2 | 8/2011 | Cinader, Jr. et al. |
| 8,021,146 B2 | 9/2011 | Cinader, Jr. et al. |
| 8,029,275 B2 | 10/2011 | Kesling |
| 8,033,824 B2 | 10/2011 | Oda et al. |
| 8,038,444 B2 | 10/2011 | Kitching et al. |
| 8,047,034 B2 | 11/2011 | Butscher |
| 8,057,226 B2 | 11/2011 | Wiechmann |
| 8,070,487 B2 | 12/2011 | Chishti et al. |
| 8,082,769 B2 | 12/2011 | Butscher et al. |
| 8,092,215 B2 | 1/2012 | Stone-Collonge et al. |
| 8,102,538 B2 | 1/2012 | Babayoff |
| 8,113,828 B1 | 2/2012 | Greenfield |
| 8,113,829 B2 | 2/2012 | Sachdeva |
| 8,114,327 B2 | 2/2012 | Cinader, Jr. et al. |
| 8,121,718 B2 | 2/2012 | Rubbert et al. |
| 8,142,187 B2 | 3/2012 | Sporbert |
| 8,152,519 B1 | 4/2012 | Dumas et al. |
| 8,177,551 B2 | 5/2012 | Sachdeva et al. |
| 8,192,196 B2 | 6/2012 | Singh |
| 8,192,197 B2 | 6/2012 | Sporbert |
| 8,194,067 B2 | 6/2012 | Raby |
| 8,220,195 B2 | 7/2012 | Maijer et al. |
| 8,251,699 B2 | 8/2012 | Reising et al. |
| 8,266,940 B2 | 9/2012 | Riemeir et al. |
| 8,297,970 B2 | 10/2012 | Kanomi |
| 8,308,478 B2 | 11/2012 | Primus et al. |
| 8,313,327 B1 | 11/2012 | Won |
| 8,359,115 B2 | 1/2013 | Kopelman et al. |
| 8,363,228 B2 | 1/2013 | Babayoff |
| 8,366,440 B2 | 2/2013 | Bathen |
| 8,376,739 B2 | 2/2013 | Dupray |
| 8,382,917 B2 | 2/2013 | Johnson |
| 8,393,896 B2 | 3/2013 | Oda |
| 8,417,366 B2 | 4/2013 | Getto et al. |
| 8,439,671 B2 | 5/2013 | Cinader, Jr. |
| 8,439,672 B2 | 5/2013 | Matov et al. |
| 8,451,456 B2 | 5/2013 | Babayoff |
| 8,454,364 B2 | 6/2013 | Taub et al. |
| 8,459,988 B2 | 6/2013 | Dumas |
| 8,465,279 B2 | 6/2013 | Bathen |
| 8,469,704 B2 | 6/2013 | Oda et al. |
| 8,479,393 B2 | 7/2013 | Abels et al. |
| 8,485,816 B2 | 7/2013 | Macchi |
| 8,491,306 B2 | 7/2013 | Raby et al. |
| D688,803 S | 8/2013 | Gilbert |
| 8,500,445 B2 | 8/2013 | Borri |
| 8,517,727 B2 | 8/2013 | Raby et al. |
| 8,545,221 B2 | 10/2013 | Sonte-Collonge et al. |
| 8,550,814 B1 | 10/2013 | Collins |
| 8,562,337 B2 | 10/2013 | Kuo et al. |
| 8,573,972 B2 | 11/2013 | Matov et al. |
| 8,591,225 B2 | 11/2013 | Wu et al. |
| 8,591,226 B2 | 11/2013 | Griffith et al. |
| 8,636,505 B2 | 1/2014 | Fornoff |
| 8,638,447 B2 | 1/2014 | Babayoff et al. |
| 8,638,448 B2 | 1/2014 | Babayoff et al. |
| 8,675,207 B2 | 3/2014 | Babayoff |
| 8,678,818 B2 | 3/2014 | Dupray |
| 8,690,568 B2 | 4/2014 | Chapouland |
| 8,708,697 B2 | 4/2014 | Li et al. |
| 8,714,972 B2 | 5/2014 | Eichenberg |
| 8,734,149 B2 | 5/2014 | Phan et al. |
| 8,734,690 B2 | 5/2014 | Komori |
| 8,780,106 B2 | 7/2014 | Chishti et al. |
| 8,805,048 B2 | 8/2014 | Batesole |
| 8,805,563 B2 | 8/2014 | Kopelman et al. |
| 8,807,995 B2 | 8/2014 | Kabbani et al. |
| 8,827,697 B2 | 9/2014 | Cinader, Jr. et al. |
| 8,845,330 B2 | 9/2014 | Taub et al. |
| 8,871,132 B2 | 10/2014 | Abels et al. |
| 8,931,171 B2 | 1/2015 | Rosenberg |
| 8,932,054 B1 | 1/2015 | Rosenberg |
| 8,936,464 B2 | 1/2015 | Kopelman |
| 8,961,172 B2 | 2/2015 | Dupray |
| 8,968,365 B2 | 3/2015 | Aschmann et al. |
| 8,979,528 B2 | 3/2015 | Macchi et al. |
| 8,986,004 B2 | 3/2015 | Dumas |
| 8,992,215 B2 | 3/2015 | Chapouland |
| 8,998,608 B2 | 4/2015 | Imgrund et al. |
| 9,022,781 B2 | 5/2015 | Kuo et al. |
| D731,659 S | 6/2015 | Singh |
| 9,066,775 B2 | 6/2015 | Bukhary |
| 9,089,386 B2 | 7/2015 | Hagelganz |
| D736,945 S | 8/2015 | Singh |
| 9,101,433 B2 | 8/2015 | Babayoff |
| 9,119,689 B2 | 9/2015 | Kabbani |
| 9,127,338 B2 | 9/2015 | Johnson |
| 9,144,473 B2 | 9/2015 | Aldo |
| 9,161,823 B2 | 10/2015 | Morton et al. |
| 9,204,942 B2 | 12/2015 | Phan et al. |
| 9,299,192 B2 | 3/2016 | Kopelman |
| 9,301,815 B2 | 4/2016 | Dumas |
| 9,329,675 B2 | 5/2016 | Ojelund et al. |
| 9,339,352 B2 | 5/2016 | Cinader et al. |
| 9,387,055 B2 | 7/2016 | Cinader, Jr. et al. |
| 9,402,695 B2 | 8/2016 | Curiel et al. |
| 9,427,291 B2 | 8/2016 | Khoshnevis et al. |
| 9,427,916 B2 | 8/2016 | Taub et al. |
| 9,433,477 B2 | 9/2016 | Borovinskih et al. |
| 9,439,737 B2 | 9/2016 | Gonzales et al. |
| 9,451,873 B1 | 9/2016 | Kopelman et al. |
| 9,492,246 B2 | 11/2016 | Lin |
| 9,498,302 B1 | 11/2016 | Patel |
| D774,193 S | 12/2016 | Makmel et al. |
| 9,510,757 B2 | 12/2016 | Kopelman et al. |
| 9,517,112 B2 | 12/2016 | Hagelganz et al. |
| 9,529,970 B2 | 12/2016 | Andreiko |
| 9,532,854 B2 | 1/2017 | Cinader et al. |
| 9,539,064 B2 | 1/2017 | Abels et al. |
| 9,554,875 B2 | 1/2017 | Gualano |
| 9,566,132 B2 | 2/2017 | Stone-collonge et al. |
| 9,566,134 B2 | 2/2017 | Hagelganz et al. |
| 9,585,733 B2 | 3/2017 | Voudouris |
| 9,585,734 B2 | 3/2017 | Lai et al. |
| 9,597,165 B2 | 3/2017 | Kopelman |
| 9,610,628 B2 | 4/2017 | Riemeier |
| 9,615,901 B2 | 4/2017 | Babayoff et al. |
| 9,622,834 B2 | 4/2017 | Chapouland |
| 9,622,835 B2 | 4/2017 | See et al. |
| 9,629,551 B2 | 4/2017 | Fisker et al. |
| 9,629,694 B2 | 4/2017 | Chun et al. |
| 9,642,678 B2 | 5/2017 | Kuo |
| 9,675,435 B2 | 6/2017 | Karazivan et al. |
| 9,707,056 B2 | 7/2017 | Machata et al. |
| 9,763,750 B2 | 9/2017 | Kim et al. |
| 9,788,917 B2 | 10/2017 | Mah |
| 9,814,543 B2 | 11/2017 | Huang et al. |
| 9,844,420 B2 | 12/2017 | Cheang |
| 9,848,958 B2 | 12/2017 | Matov et al. |
| 9,867,678 B2 | 1/2018 | Macchi |
| 9,867,680 B2 | 1/2018 | Damon |
| 9,872,741 B2 | 1/2018 | Gualano |
| 9,877,804 B2 | 1/2018 | Chester |
| 9,877,805 B2 | 1/2018 | Abels et al. |
| 9,925,020 B2 | 3/2018 | Jo |
| 9,937,018 B2 | 4/2018 | Martz et al. |
| 9,937,020 B2 | 4/2018 | Choi |
| 9,956,058 B2 | 5/2018 | Kopelman |
| 9,962,244 B2 | 5/2018 | Esbech et al. |
| 9,975,294 B2 | 5/2018 | Taub et al. |
| 9,987,105 B2 | 6/2018 | Dupray |
| 10,028,804 B2 | 7/2018 | Schulhof et al. |
| 10,045,834 B2 | 8/2018 | Gualano |
| 10,052,177 B2 | 8/2018 | Andreiko |
| 10,058,400 B2 | 8/2018 | Abels et al. |
| 10,058,401 B2 | 8/2018 | Tan |
| 10,064,706 B2 | 9/2018 | Dickerson |
| 10,070,943 B2 | 9/2018 | Fornoff |
| 10,076,780 B2 | 9/2018 | Riemeier et al. |

(56) References Cited

U.S. PATENT DOCUMENTS

| | | |
|---|---|---|
| 10,098,709 B1 | 10/2018 | Kitching et al. |
| 10,130,987 B2 | 11/2018 | Riemeier et al. |
| 10,136,966 B2 | 11/2018 | Reybrouck et al. |
| 10,149,738 B2 | 12/2018 | Lee |
| 10,179,035 B2 | 1/2019 | Shivapuja et al. |
| 10,179,036 B2 | 1/2019 | Lee |
| 10,219,877 B2 | 3/2019 | Khoshnevis et al. |
| 10,226,312 B2 | 3/2019 | Khoshnevis et al. |
| 10,238,476 B2 | 3/2019 | Karazivan et al. |
| 10,241,499 B1 | 3/2019 | Griffin |
| 10,278,791 B2 | 5/2019 | Schumacher |
| 10,278,792 B2 | 5/2019 | Wool |
| 10,278,793 B2 | 5/2019 | Gonzalez et al. |
| 10,292,789 B2 | 5/2019 | Martz et al. |
| 10,307,221 B2 | 6/2019 | Cinader, Jr. |
| 10,314,673 B2 | 6/2019 | Schulhof et al. |
| 10,327,867 B2 | 6/2019 | Nikolskiy et al. |
| 10,342,640 B2 | 7/2019 | Cassalia |
| 10,368,961 B2 | 8/2019 | Paehl et al. |
| 10,383,707 B2 | 8/2019 | Roein Peikar et al. |
| D859,663 S | 9/2019 | Cetta et al. |
| 10,413,386 B2 | 9/2019 | Moon et al. |
| 10,426,575 B1 | 10/2019 | Raslambekov |
| 10,456,228 B2 | 10/2019 | Karazivan et al. |
| 10,478,271 B2 | 11/2019 | Patel |
| 10,485,638 B2 | 11/2019 | Salah |
| 10,492,889 B2 | 12/2019 | Kim et al. |
| 10,492,890 B2 | 12/2019 | Cinader, Jr. et al. |
| 10,555,792 B2 | 2/2020 | Kopelman et al. |
| 10,588,717 B2 | 3/2020 | Chun et al. |
| 10,595,966 B2 | 3/2020 | Carrier, Jr. et al. |
| 10,596,717 B2 | 3/2020 | Hashish et al. |
| 10,603,137 B2 | 3/2020 | Alauddin et al. |
| 10,636,522 B2 | 4/2020 | Katzman et al. |
| 10,639,130 B2 | 5/2020 | Blees et al. |
| 10,639,134 B2 | 5/2020 | Shangjani et al. |
| 10,717,208 B1 | 7/2020 | Raslambekov et al. |
| 10,754,325 B1 | 8/2020 | Griffin, III |
| 10,758,323 B2 | 9/2020 | Kopelman |
| 10,772,706 B2 | 9/2020 | Schumacher |
| 10,806,376 B2 | 10/2020 | Lotan et al. |
| 10,809,697 B2 | 10/2020 | Grapsas |
| 10,828,133 B2 | 11/2020 | Tong et al. |
| 10,849,723 B1 | 12/2020 | Yancey et al. |
| 10,869,738 B2 | 12/2020 | Witte et al. |
| 10,881,488 B2 | 1/2021 | Kopelman |
| 10,881,489 B2 * | 1/2021 | Tong ................... A61C 7/12 |
| 10,905,527 B2 | 2/2021 | Roein Peikar et al. |
| 10,932,887 B2 | 3/2021 | Hung |
| 10,935,958 B2 | 3/2021 | Sirovskiy et al. |
| 10,952,820 B2 | 3/2021 | Song et al. |
| 10,980,614 B2 | 4/2021 | Roein Peikar et al. |
| 10,984,549 B2 | 4/2021 | Goncharov et al. |
| 10,993,782 B1 | 5/2021 | Raslambekov |
| 10,993,785 B2 | 5/2021 | Roein Peikar et al. |
| 10,996,813 B2 | 5/2021 | Makarenkova et al. |
| 11,020,205 B2 | 6/2021 | Li et al. |
| 11,045,281 B2 | 6/2021 | Tsai et al. |
| 11,045,295 B2 | 6/2021 | Karazivan et al. |
| 11,058,517 B2 | 7/2021 | Tong et al. |
| 11,058,518 B2 | 7/2021 | Roein Peikar et al. |
| 11,058,520 B2 | 7/2021 | Khoshnevis et al. |
| 11,072,021 B2 | 7/2021 | Riemeier et al. |
| 11,083,411 B2 | 8/2021 | Yancey et al. |
| 11,083,546 B2 | 8/2021 | Cassalia |
| 11,103,330 B2 | 8/2021 | Webber et al. |
| 11,129,696 B2 | 9/2021 | Khoshnevis et al. |
| 11,147,652 B2 | 10/2021 | Mason et al. |
| 11,154,382 B2 | 10/2021 | Kopelman et al. |
| 11,229,505 B2 | 1/2022 | Schumacher et al. |
| 11,234,794 B2 | 2/2022 | Pokotilov et al. |
| 11,259,899 B2 | 3/2022 | Hoss et al. |
| 11,304,781 B2 | 4/2022 | Chun et al. |
| 11,317,994 B2 | 5/2022 | Peikar et al. |
| 11,317,995 B2 | 5/2022 | Peikar et al. |
| 11,324,572 B2 | 5/2022 | Peikar et al. |
| 11,331,165 B2 | 5/2022 | Owen |
| 11,337,486 B2 | 5/2022 | Oda et al. |
| 11,357,598 B2 | 6/2022 | Cramer |
| 11,382,720 B2 | 7/2022 | Kopelman et al. |
| 11,413,117 B2 | 8/2022 | Griffin, III et al. |
| 11,419,701 B2 | 8/2022 | Shanjani et al. |
| 11,433,658 B2 | 9/2022 | Friedrich et al. |
| 11,435,142 B2 | 9/2022 | Hauptmann |
| 11,446,117 B2 | 9/2022 | Paehl et al. |
| 11,446,219 B2 | 9/2022 | Kohler et al. |
| 11,464,604 B2 | 10/2022 | Makarenkova et al. |
| 11,471,254 B2 | 10/2022 | Owen |
| 11,471,255 B2 | 10/2022 | Cinader, Jr. et al. |
| 11,478,335 B2 | 10/2022 | Lai et al. |
| 11,478,337 B2 | 10/2022 | Griffin, III et al. |
| 11,490,995 B2 | 11/2022 | Wratten, Jr. et al. |
| 11,500,354 B2 | 11/2022 | Griffin, III et al. |
| 11,504,212 B2 | 11/2022 | Wratten, Jr. et al. |
| 11,510,757 B2 | 11/2022 | Khoshnevis et al. |
| 11,510,758 B2 | 11/2022 | Khoshnevis et al. |
| D972,732 S | 12/2022 | Villanueva |
| 11,517,405 B2 | 12/2022 | Khoshnevis et al. |
| 11,612,458 B1 | 3/2023 | Tong et al. |
| 11,612,459 B2 | 3/2023 | Tong et al. |
| 11,696,816 B2 | 7/2023 | Gardner |
| 11,911,971 B2 | 2/2024 | Tong et al. |
| 11,957,536 B2 * | 4/2024 | Tong ................... A61C 7/12 |
| 12,042,354 B2 | 7/2024 | Tong et al. |
| 12,053,345 B2 | 8/2024 | Tong et al. |
| 12,053,346 B2 | 8/2024 | Suh et al. |
| D1,043,994 S | 9/2024 | Oda et al. |
| 12,090,025 B2 | 9/2024 | Oda et al. |
| 12,193,908 B2 | 1/2025 | Oda et al. |
| 2001/0055741 A1 | 12/2001 | Dixon et al. |
| 2002/0006597 A1 | 1/2002 | Andreiko et al. |
| 2002/0010568 A1 | 1/2002 | Rubbert et al. |
| 2002/0081546 A1 | 6/2002 | Tricca et al. |
| 2002/0098460 A1 | 7/2002 | Farzin-Nia |
| 2002/0192617 A1 | 12/2002 | Phan et al. |
| 2003/0049582 A1 | 3/2003 | Abels et al. |
| 2003/0070468 A1 | 4/2003 | Butscher et al. |
| 2003/0180689 A1 | 9/2003 | Arx et al. |
| 2003/0194677 A1 | 10/2003 | Sachdeva et al. |
| 2003/0207224 A1 | 11/2003 | Lotte |
| 2004/0048222 A1 | 3/2004 | Forster et al. |
| 2004/0072120 A1 | 4/2004 | Lauren |
| 2004/0083611 A1 | 5/2004 | Rubbert et al. |
| 2004/0161722 A1 | 8/2004 | Lai et al. |
| 2004/0166459 A1 | 8/2004 | Voudouris |
| 2004/0168752 A1 | 9/2004 | Julien |
| 2004/0199177 A1 | 10/2004 | Kim |
| 2004/0219471 A1 | 11/2004 | Cleary et al. |
| 2005/0043837 A1 | 2/2005 | Rubbert et al. |
| 2005/0074716 A1 | 4/2005 | Cleary et al. |
| 2005/0106529 A1 | 5/2005 | Abolfathi et al. |
| 2005/0181332 A1 | 8/2005 | Sernetz |
| 2005/0191592 A1 | 9/2005 | Farzin-Nia et al. |
| 2005/0233276 A1 | 10/2005 | Kopelman et al. |
| 2005/0244780 A1 | 11/2005 | Abels et al. |
| 2005/0244781 A1 | 11/2005 | Abels et al. |
| 2005/0244790 A1 | 11/2005 | Kuperman |
| 2006/0006092 A1 | 1/2006 | DuBos |
| 2006/0014116 A1 | 1/2006 | Maijer et al. |
| 2006/0068354 A1 | 3/2006 | Jeckel |
| 2006/0127834 A1 | 6/2006 | Szwajkowski et al. |
| 2006/0175209 A1 | 8/2006 | Sabilla et al. |
| 2006/0223021 A1 | 10/2006 | Cinader, Jr. et al. |
| 2006/0223031 A1 | 10/2006 | Cinader, Jr. et al. |
| 2006/0257813 A1 | 11/2006 | Highland |
| 2006/0257821 A1 | 11/2006 | Cinader, Jr. et al. |
| 2007/0015103 A1 | 1/2007 | Sorel |
| 2007/0031773 A1 | 2/2007 | Scuzzo |
| 2007/0031775 A1 | 2/2007 | Andreiko |
| 2007/0087302 A1 | 4/2007 | Reising et al. |
| 2007/0107745 A1 | 5/2007 | Kiyomoto |
| 2007/0111154 A1 | 5/2007 | Sampermans |
| 2007/0118215 A1 | 5/2007 | Moaddeb |
| 2007/0134611 A1 | 6/2007 | Nicholson |

(56) References Cited

U.S. PATENT DOCUMENTS

| | | |
|---|---|---|
| 2007/0134612 A1 | 6/2007 | Contencin |
| 2007/0141525 A1 | 6/2007 | Cinader, Jr. |
| 2007/0154859 A1 | 7/2007 | Hilliard |
| 2007/0172788 A1 | 7/2007 | Hill, II et al. |
| 2007/0190478 A1 | 8/2007 | Goldberg et al. |
| 2007/0231768 A1 | 10/2007 | Hutchinson |
| 2007/0235051 A1 | 10/2007 | Robinson |
| 2007/0287121 A1 | 12/2007 | Cinader et al. |
| 2008/0032250 A1 | 2/2008 | Kopelman et al. |
| 2008/0057460 A1 | 3/2008 | Hicks |
| 2008/0063995 A1 | 3/2008 | Farzin-Nia et al. |
| 2008/0131831 A1 | 6/2008 | Abels et al. |
| 2008/0160475 A1 | 7/2008 | Rojas-Pardini |
| 2008/0199825 A1 | 8/2008 | Jahn |
| 2008/0227049 A1 | 9/2008 | Sevinc |
| 2008/0233528 A1 | 9/2008 | Kim et al. |
| 2008/0233530 A1 | 9/2008 | Cinader |
| 2008/0233531 A1 | 9/2008 | Raby et al. |
| 2008/0248439 A1 | 10/2008 | Griffith et al. |
| 2008/0254403 A1 | 10/2008 | Hilliard |
| 2008/0268398 A1 | 10/2008 | Cantarella |
| 2008/0286711 A1 | 11/2008 | Corcoran et al. |
| 2008/0305450 A1 | 12/2008 | Steen |
| 2009/0004619 A1 | 1/2009 | Oda et al. |
| 2009/0019698 A1 | 1/2009 | Christoff |
| 2009/0042160 A1 | 2/2009 | Ofir |
| 2009/0088838 A1 | 4/2009 | Shaolian et al. |
| 2009/0136889 A1 | 5/2009 | Abels et al. |
| 2009/0191502 A1 | 7/2009 | Cao et al. |
| 2009/0197217 A1 | 8/2009 | Butscher et al. |
| 2009/0216322 A1 | 8/2009 | Le et al. |
| 2009/0220907 A1 | 9/2009 | Suyama |
| 2009/0220920 A1 | 9/2009 | Primus et al. |
| 2009/0222075 A1 | 9/2009 | Gordon |
| 2010/0092903 A1 | 4/2010 | Sabilla |
| 2010/0092905 A1 | 4/2010 | Martin |
| 2010/0105000 A1 | 4/2010 | Scommegna et al. |
| 2010/0129765 A1 | 5/2010 | Mohr et al. |
| 2010/0129766 A1 | 5/2010 | Hilgers |
| 2010/0151403 A1 | 6/2010 | Tuneberg |
| 2010/0178628 A1 | 7/2010 | Kim |
| 2010/0179789 A1 | 7/2010 | Sachdeva et al. |
| 2010/0193979 A1 | 8/2010 | Goldberg et al. |
| 2010/0241120 A1 | 9/2010 | Bledsoe et al. |
| 2010/0279243 A1 | 11/2010 | Cinader, Jr. et al. |
| 2010/0285421 A1 | 11/2010 | Heiser |
| 2010/0304321 A1* | 12/2010 | Patel ................. A61C 7/20 433/10 |
| 2011/0008745 A1 | 1/2011 | McQuillan et al. |
| 2011/0027743 A1 | 2/2011 | Cinader, Jr. et al. |
| 2011/0059414 A1 | 3/2011 | Hirsch |
| 2011/0091832 A1 | 4/2011 | Kim et al. |
| 2011/0220612 A1* | 9/2011 | Kim ................. A61C 7/20 216/37 |
| 2011/0250556 A1 | 10/2011 | Heiser |
| 2011/0270583 A1 | 11/2011 | Getto et al. |
| 2011/0287376 A1 | 11/2011 | Walther |
| 2011/0314891 A1 | 12/2011 | Gilbert |
| 2012/0048432 A1 | 3/2012 | Johnson et al. |
| 2012/0129119 A1 | 5/2012 | Oda |
| 2012/0148972 A1* | 6/2012 | Lewis ................. A61C 7/12 433/10 |
| 2012/0208144 A1 | 8/2012 | Chiaramonte |
| 2012/0266419 A1 | 10/2012 | Browne et al. |
| 2012/0315595 A1 | 12/2012 | Beaudoin |
| 2012/0322019 A1 | 12/2012 | Lewis |
| 2013/0065193 A1 | 3/2013 | Curiel et al. |
| 2013/0122443 A1 | 5/2013 | Huang et al. |
| 2013/0177862 A1 | 7/2013 | Johnson |
| 2013/0196281 A1 | 8/2013 | Thornton |
| 2013/0196282 A1 | 8/2013 | Eichelberger et al. |
| 2013/0260329 A1 | 10/2013 | Voudouris |
| 2013/0315595 A1 | 11/2013 | Barr |
| 2014/0154637 A1 | 6/2014 | Hansen et al. |
| 2014/0170586 A1 | 6/2014 | Cantarella |
| 2014/0234794 A1 | 8/2014 | Vu |
| 2014/0255864 A1 | 9/2014 | Machata et al. |
| 2014/0287376 A1 | 9/2014 | Hultgren et al. |
| 2014/0363782 A1 | 12/2014 | Wiechmann et al. |
| 2015/0010879 A1 | 1/2015 | Kurthy |
| 2015/0064641 A1 | 3/2015 | Gardner |
| 2015/0072299 A1 | 3/2015 | Alauddin et al. |
| 2015/0140501 A1 | 5/2015 | Kim |
| 2015/0201943 A1 | 7/2015 | Brooks et al. |
| 2015/0265376 A1 | 9/2015 | Kopelman |
| 2015/0305833 A1 | 10/2015 | Cosse |
| 2015/0313687 A1 | 11/2015 | Blees et al. |
| 2015/0351872 A1 | 12/2015 | Jo |
| 2015/0359610 A1 | 12/2015 | Gonzalez et al. |
| 2015/0366638 A1 | 12/2015 | Kopelman et al. |
| 2016/0074139 A1 | 3/2016 | Machata et al. |
| 2016/0095670 A1 | 4/2016 | Witte et al. |
| 2016/0106522 A1 | 4/2016 | Kim |
| 2016/0135926 A1 | 5/2016 | Djamchidi |
| 2016/0166357 A1 | 6/2016 | Portalupi |
| 2016/0175073 A1 | 6/2016 | Huang |
| 2016/0206403 A1 | 7/2016 | Ouellette et al. |
| 2016/0228214 A1 | 8/2016 | Sachdeva et al. |
| 2016/0242871 A1 | 8/2016 | Morton et al. |
| 2016/0256242 A1 | 9/2016 | Cinader, Jr. et al. |
| 2016/0270885 A1 | 9/2016 | Kwon et al. |
| 2016/0278883 A1 | 9/2016 | Fasci et al. |
| 2016/0287354 A1 | 10/2016 | Viecilli et al. |
| 2016/0310239 A1 | 10/2016 | Paehl et al. |
| 2016/0374780 A1 | 12/2016 | Carrillo Gonzalez et al. |
| 2017/0086948 A1 | 3/2017 | Von Mandach |
| 2017/0105816 A1 | 4/2017 | Ward |
| 2017/0105817 A1 | 4/2017 | Chun et al. |
| 2017/0128169 A1 | 5/2017 | Lai et al. |
| 2017/0135793 A1 | 5/2017 | Webber et al. |
| 2017/0140381 A1 | 5/2017 | Ducrohet et al. |
| 2017/0151037 A1 | 6/2017 | Lee |
| 2017/0156823 A1 | 6/2017 | Roein Peikar et al. |
| 2017/0165032 A1 | 6/2017 | Webber et al. |
| 2017/0165532 A1 | 6/2017 | Khan et al. |
| 2017/0181813 A1 | 6/2017 | Kalkhoran |
| 2017/0196660 A1 | 7/2017 | Lee |
| 2017/0224444 A1 | 8/2017 | Viecilli et al. |
| 2017/0231721 A1 | 8/2017 | Akeel et al. |
| 2017/0246682 A1 | 8/2017 | Duerig |
| 2017/0252140 A1 | 9/2017 | Murphy et al. |
| 2017/0281313 A1 | 10/2017 | Kim |
| 2017/0281314 A1 | 10/2017 | Freimuller |
| 2017/0296253 A1 | 10/2017 | Brandner et al. |
| 2017/0296304 A1 | 10/2017 | Tong et al. |
| 2017/0312052 A1 | 11/2017 | Moss et al. |
| 2017/0318881 A1 | 11/2017 | Fonte et al. |
| 2017/0325911 A1 | 11/2017 | Marshall |
| 2017/0340777 A1 | 11/2017 | Ma et al. |
| 2018/0014915 A1 | 1/2018 | Voudouris |
| 2018/0014916 A1 | 1/2018 | Cinader, Jr. et al. |
| 2018/0021108 A1 | 1/2018 | Cinader, Jr. et al. |
| 2018/0049847 A1 | 2/2018 | Oda et al. |
| 2018/0055605 A1 | 3/2018 | Witte et al. |
| 2018/0071057 A1 | 3/2018 | Rudman |
| 2018/0110589 A1 | 4/2018 | Gao |
| 2018/0132974 A1 | 5/2018 | Rudman |
| 2018/0161121 A1 | 6/2018 | Butler et al. |
| 2018/0161126 A1 | 6/2018 | Marshall et al. |
| 2018/0168788 A1 | 6/2018 | Fernie |
| 2018/0185120 A1 | 7/2018 | Wool |
| 2018/0185121 A1 | 7/2018 | Pitts et al. |
| 2018/0206941 A1 | 7/2018 | Lee |
| 2018/0214250 A1 | 8/2018 | Martz |
| 2018/0235437 A1 | 8/2018 | Ozerov et al. |
| 2018/0243052 A1 | 8/2018 | Lee |
| 2018/0318047 A1 | 11/2018 | Kesling |
| 2018/0338564 A1 | 11/2018 | Oda et al. |
| 2019/0001396 A1 | 1/2019 | Riemeier et al. |
| 2019/0019187 A1 | 1/2019 | Miller et al. |
| 2019/0053876 A1 | 2/2019 | Sterental et al. |
| 2019/0090988 A1 | 3/2019 | Schumacher et al. |
| 2019/0090989 A1 | 3/2019 | Jo |
| 2019/0125494 A1 | 5/2019 | Li et al. |

(56) References Cited

U.S. PATENT DOCUMENTS

| | | |
|---|---|---|
| 2019/0142551 A1 | 5/2019 | Dickenson et al. |
| 2019/0159871 A1 | 5/2019 | Chan et al. |
| 2019/0163060 A1 | 5/2019 | Skamser et al. |
| 2019/0175304 A1 | 6/2019 | Morton et al. |
| 2019/0231488 A1 | 8/2019 | Dickerson |
| 2019/0247147 A1 | 8/2019 | Grande et al. |
| 2019/0252065 A1 | 8/2019 | Katzman et al. |
| 2019/0262103 A1 | 8/2019 | Cassalia |
| 2019/0276921 A1 | 9/2019 | Duerig et al. |
| 2019/0321136 A1 | 10/2019 | Martz et al. |
| 2019/0321138 A1 | 10/2019 | Roein Peikar et al. |
| 2019/0328487 A1 | 10/2019 | Levin et al. |
| 2019/0328491 A1 | 10/2019 | Hostettler et al. |
| 2019/0343606 A1 | 11/2019 | Wu et al. |
| 2019/0350682 A1 | 11/2019 | Cinader, Jr. et al. |
| 2019/0388189 A1 | 12/2019 | Shivapuja et al. |
| 2020/0000551 A1 | 1/2020 | Li et al. |
| 2020/0066391 A1 | 2/2020 | Sachdeva et al. |
| 2020/0078137 A1 | 3/2020 | Chen et al. |
| 2020/0107911 A1 | 4/2020 | Roein Peikar et al. |
| 2020/0129272 A1 | 4/2020 | Roein Peikar et al. |
| 2020/0138549 A1 | 5/2020 | Chun et al. |
| 2020/0146779 A1 | 5/2020 | Zhang |
| 2020/0146791 A1 | 5/2020 | Schülke et al. |
| 2020/0170757 A1 | 6/2020 | Kopelman et al. |
| 2020/0188063 A1 | 6/2020 | Cinader, Jr. et al. |
| 2020/0197131 A1 | 6/2020 | Matov et al. |
| 2020/0214806 A1 | 7/2020 | Hung |
| 2020/0229903 A1 | 7/2020 | Sandwick |
| 2020/0275996 A1 | 9/2020 | Tong et al. |
| 2020/0281611 A1 | 9/2020 | Kelly et al. |
| 2020/0338706 A1 | 10/2020 | Cunningham et al. |
| 2020/0345455 A1 | 11/2020 | Roein Peikar et al. |
| 2020/0345459 A1 | 11/2020 | Schueller et al. |
| 2020/0345460 A1 | 11/2020 | Roein Peikar et al. |
| 2020/0352765 A1 | 11/2020 | Lin |
| 2020/0360109 A1 | 11/2020 | Gao et al. |
| 2020/0375270 A1 | 12/2020 | Holschuh et al. |
| 2020/0375699 A1 | 12/2020 | Roein Peikar et al. |
| 2020/0390524 A1 | 12/2020 | Roein Peikar et al. |
| 2020/0390535 A1 | 12/2020 | Curtis et al. |
| 2020/0405191 A1 | 12/2020 | Lotan et al. |
| 2020/0405452 A1 | 12/2020 | Song et al. |
| 2021/0007830 A1 | 1/2021 | Roein Peikar et al. |
| 2021/0007832 A1 | 1/2021 | Roein Peikar et al. |
| 2021/0045701 A1 | 2/2021 | Unklesbay et al. |
| 2021/0068928 A1 | 3/2021 | Witte et al. |
| 2021/0077227 A1 | 3/2021 | Griffin, III et al. |
| 2021/0093422 A1 | 4/2021 | Tong et al. |
| 2021/0128275 A1 | 5/2021 | Suh et al. |
| 2021/0134450 A1 | 5/2021 | Katzman et al. |
| 2021/0137644 A1 | 5/2021 | Benarouch et al. |
| 2021/0145547 A1 | 5/2021 | Roein Peikar et al. |
| 2021/0177551 A1 | 6/2021 | Roein Peikar et al. |
| 2021/0186662 A1 | 6/2021 | Roein Peikar et al. |
| 2021/0205049 A1 | 7/2021 | Cinader, Jr. |
| 2021/0212803 A1 | 7/2021 | Tong et al. |
| 2021/0244502 A1 | 8/2021 | Farkash et al. |
| 2021/0244505 A1 | 8/2021 | Tong et al. |
| 2021/0244507 A1 | 8/2021 | Curiel et al. |
| 2021/0251730 A1 | 8/2021 | Curiel et al. |
| 2021/0259808 A1 | 8/2021 | Ben-gal Nguyen et al. |
| 2021/0275286 A1 | 9/2021 | Karazivan et al. |
| 2021/0330430 A1 | 10/2021 | Khoshnevis et al. |
| 2021/0338380 A1 | 11/2021 | Park et al. |
| 2021/0346127 A1 | 11/2021 | Cassalia |
| 2021/0353389 A1 | 11/2021 | Peikar et al. |
| 2021/0369413 A1 | 12/2021 | Li et al. |
| 2021/0378792 A1 | 12/2021 | Akopov et al. |
| 2021/0386523 A1 | 12/2021 | Raby, II et al. |
| 2021/0393375 A1 | 12/2021 | Chekh et al. |
| 2021/0401546 A1 | 12/2021 | Gardner |
| 2021/0401548 A1 | 12/2021 | Oda et al. |
| 2022/0008169 A1 | 1/2022 | Reisman |
| 2022/0023009 A1 | 1/2022 | Tong et al. |
| 2022/0031428 A1 | 2/2022 | Khoshnevis et al. |
| 2022/0039921 A1 | 2/2022 | Kopelman et al. |
| 2022/0039922 A1 | 2/2022 | Yamaguchi |
| 2022/0061964 A1 | 3/2022 | Khoshnevis et al. |
| 2022/0087783 A1 | 3/2022 | Khoshnevis et al. |
| 2022/0133438 A1 | 5/2022 | Wratten, Jr. et al. |
| 2022/0137592 A1 | 5/2022 | Cramer et al. |
| 2022/0168072 A1 | 6/2022 | Tong et al. |
| 2022/0183797 A1 | 6/2022 | Khoshnevis et al. |
| 2022/0226076 A1 | 7/2022 | Roein Peikar et al. |
| 2022/0226077 A1 | 7/2022 | Roein Peikar et al. |
| 2022/0249201 A1 | 8/2022 | Shuman et al. |
| 2022/0257341 A1 | 8/2022 | Somasundaram et al. |
| 2022/0257344 A1 | 8/2022 | Tsai et al. |
| 2022/0287804 A1 | 9/2022 | Oda |
| 2022/0304773 A1 | 9/2022 | Wratten, Jr. et al. |
| 2022/0304774 A1 | 9/2022 | Wratten, Jr. et al. |
| 2022/0314508 A1 | 10/2022 | Subramaniam et al. |
| 2022/0323183 A1 | 10/2022 | Dufour et al. |
| 2022/0338960 A1 | 10/2022 | Reising |
| 2022/0346912 A1 | 11/2022 | Li et al. |
| 2022/0361996 A1 | 11/2022 | Raby et al. |
| 2023/0012364 A1 | 1/2023 | Melka et al. |
| 2023/0070165 A1 | 3/2023 | Tong et al. |
| 2023/0070837 A1 | 3/2023 | Oda |
| 2023/0072074 A1 | 3/2023 | Oda et al. |
| 2023/0100466 A1 | 3/2023 | Huynh et al. |
| 2023/0157790 A1 | 5/2023 | Medvinskaya et al. |
| 2023/0404715 A1 | 12/2023 | Peikar et al. |
| 2023/0414327 A1 | 12/2023 | Peikar et al. |
| 2024/0058101 A1 | 2/2024 | Tong et al. |
| 2024/0061966 A1 | 2/2024 | Oda et al. |
| 2024/0090980 A1 | 3/2024 | Tong et al. |
| 2024/0138958 A1 | 5/2024 | Oda et al. |
| 2024/0173105 A1 | 5/2024 | Tong et al. |
| 2024/0277452 A1 | 8/2024 | Tong et al. |
| 2024/0398513 A1 | 12/2024 | Oda et al. |

FOREIGN PATENT DOCUMENTS

| | | |
|---|---|---|
| CN | 201320224 Y | 10/2009 |
| CN | 102215773 | 10/2011 |
| CN | 202365955 | 8/2012 |
| CN | 202892116 | 4/2013 |
| CN | 203074896 | 7/2013 |
| CN | 103505293 | 1/2014 |
| CN | 203506900 | 4/2014 |
| CN | 104188728 | 12/2014 |
| CN | 204049881 | 12/2014 |
| CN | 205126459 | 4/2016 |
| CN | 105596098 | 5/2016 |
| CN | 105662615 | 6/2016 |
| CN | 205416056 | 8/2016 |
| CN | 205569100 | 9/2016 |
| CN | 106029002 | 10/2016 |
| CN | 106137419 | 11/2016 |
| CN | 105520787 | 12/2017 |
| CN | 108690967 | 10/2018 |
| CN | 109009504 | 12/2018 |
| CN | 110916820 | 2/2020 |
| CN | 110840586 | 2/2022 |
| CN | 114167807 | 3/2022 |
| CN | 117695035 | 3/2024 |
| DE | 3915807 | 11/1990 |
| DE | 20 2018 003 574 U1 | 8/2018 |
| DE | 10 2018 005 769 A1 | 1/2020 |
| DE | 10 2018 133 705 A1 | 7/2020 |
| DE | 10 2015 017 301 | 3/2022 |
| EP | 0 778 008 | 6/1997 |
| EP | 1 139 902 | 10/2001 |
| EP | 1 276 433 | 1/2003 |
| EP | 1 379 193 | 2/2007 |
| EP | 2 076 207 | 7/2009 |
| EP | 1 073 378 | 1/2012 |
| EP | 2 522 298 | 11/2012 |
| EP | 2 617 383 | 7/2013 |
| EP | 3 285 678 | 5/2021 |
| EP | 3 954 320 | 2/2022 |
| EP | 2 726 049 | 8/2022 |

(56) References Cited

FOREIGN PATENT DOCUMENTS

| | | |
|---|---|---|
| EP | 3 019 141 | 8/2022 |
| EP | 4 034 077 | 8/2022 |
| EP | 4 035 649 | 8/2022 |
| EP | 4 044 959 | 8/2022 |
| EP | 4 048 196 | 8/2022 |
| EP | 4065647 A1 | 8/2022 |
| EP | 3 691 559 | 9/2022 |
| EP | 3 823 813 | 9/2022 |
| EP | 3 905 986 | 9/2022 |
| EP | 4 056 144 | 9/2022 |
| ES | 2 315 046 | 4/2010 |
| FR | 2 525 469 | 10/1983 |
| FR | 3 056 393 | 10/2018 |
| JP | 11221235 A | 8/1999 |
| JP | 2001198143 A | 7/2001 |
| JP | 2009205330 A | 9/2009 |
| KR | 100549294 | 2/2006 |
| KR | 100737442 | 7/2007 |
| KR | 100925286 | 11/2009 |
| KR | 101301886 | 8/2013 |
| KR | 101583547 | 1/2016 |
| KR | 101584737 | 1/2016 |
| KR | 101723674 | 4/2017 |
| RU | 133408 U1 | 10/2013 |
| WO | WO 01/80761 | 11/2001 |
| WO | WO 01/85047 | 11/2001 |
| WO | WO 2003/045266 | 6/2003 |
| WO | WO 2005/008441 | 1/2005 |
| WO | WO 2005/094716 | 10/2005 |
| WO | WO 2007/069286 | 6/2007 |
| WO | WO 2008/051774 | 5/2008 |
| WO | WO 2011/034522 | 3/2011 |
| WO | WO 2011/090502 | 7/2011 |
| WO | WO 2011/103669 | 9/2011 |
| WO | WO 2012/089735 | 7/2012 |
| WO | WO 2012/140021 | 10/2012 |
| WO | WO 2013/019398 | 2/2013 |
| WO | WO 2014/070920 | 5/2014 |
| WO | WO 2016/148961 | 9/2016 |
| WO | WO 2016/149007 | 9/2016 |
| WO | WO 2016/149008 | 9/2016 |
| WO | WO 2016/199972 | 12/2016 |
| WO | WO 2016/210402 | 12/2016 |
| WO | WO 2017/007079 | 1/2017 |
| WO | WO 2017/100198 | 6/2017 |
| WO | WO 2017/112004 | 6/2017 |
| WO | WO 2017/172537 | 10/2017 |
| WO | WO 2017/184632 | 10/2017 |
| WO | WO 2017/194478 | 11/2017 |
| WO | WO 2017/198640 | 11/2017 |
| WO | WO 2018/102588 | 6/2018 |
| WO | WO 2018/122862 | 7/2018 |
| WO | WO 2018/144634 | 8/2018 |
| WO | WO 2018/195356 | 10/2018 |
| WO | WO 2019/135504 | 7/2019 |
| WO | WO 2020/095182 | 5/2020 |
| WO | WO 2020/178353 | 9/2020 |
| WO | WO 2020/180740 | 9/2020 |
| WO | WO 2020/223744 | 11/2020 |
| WO | WO 2020/223745 | 11/2020 |
| WO | WO 2021/087158 | 5/2021 |
| WO | WO 2021/105878 | 6/2021 |
| WO | WO 2021/214613 | 10/2021 |
| WO | WO 2021/225916 | 11/2021 |
| WO | WO 2021/226618 | 11/2021 |
| WO | WO 2021/245484 | 12/2021 |
| WO | WO 2021/252675 | 12/2021 |
| WO | WO 2022/099263 | 5/2022 |
| WO | WO 2022/099267 | 5/2022 |
| WO | WO 2022/123402 | 6/2022 |
| WO | WO 2022/137109 | 6/2022 |
| WO | WO 2022/145602 | 7/2022 |
| WO | WO 2022/159738 | 7/2022 |
| WO | WO 2022/162488 | 8/2022 |
| WO | WO 2022/162528 | 8/2022 |
| WO | WO 2022/162614 | 8/2022 |
| WO | WO 2022/167899 | 8/2022 |
| WO | WO 2022/167995 | 8/2022 |
| WO | WO 2022/180466 | 9/2022 |
| WO | WO 2022/189906 | 9/2022 |
| WO | WO 2022/192409 | 9/2022 |
| WO | WO 2022/195391 | 9/2022 |
| WO | WO 2022/204711 | 9/2022 |
| WO | WO 2022/214895 | 10/2022 |
| WO | WO 2022/217269 | 10/2022 |
| WO | WO 2022/219459 | 10/2022 |
| WO | WO 2022/229734 | 11/2022 |
| WO | WO 2022/229739 | 11/2022 |
| WO | WO 2022/236027 | 11/2022 |
| WO | WO 2022/236287 | 11/2022 |
| WO | WO 2023/033869 | 3/2023 |
| WO | WO 2023/033870 | 3/2023 |
| WO | WO 2023/034876 | 3/2023 |
| WO | WO 2024/040008 | 2/2024 |
| WO | WO 2024/059653 | 3/2024 |

OTHER PUBLICATIONS

Elheikh, Moaaz Mohamed, et al. "A Forsus Distalizer: A Pilot Typodont Study". Jul.-Dec. 2004, KDJ, vol. 7, No. 2, pp. 107-115.
EP Search Report dated Jun. 23, 2016 in EP application No. 13850778.5 in 5 pages.
EP Search Report dated May 29, 2020 in EP Application No. 17875658.1.
CN Office Action dated Nov. 11, 2020 in CN Application No. 2018800149154.
EP Search Report dated Aug. 28, 2020 in EP Application No. 18748336.7.
Extended European Search Report dated Nov. 9, 2020 in EP Application No. 18787728.7.
CN Office Action dated Jun. 30, 2020 in CN Application No. 201780033738X.
Gilbert, Alfredo. An in-office wire-bending robot for lingual orthodontics. ResearchGate. Article in Journal of clinical orthodontics: JCO, dated Apr. 2011.
Glauser-Williams Orthodontics: Appliances, http://www.glauserwilliamsorthodontics.com/treatments/orthodontic-appliances.php, accessed Nov. 30, 2015 in 4 pages.
Invisalign® SmileView™, How Would You Look with Straight Teeth?, https://www.invisalign.com/get-started/invisalign-smileview?v=0#start, printed Jun. 7, 2022 in 2 pages.
IPhone 3D scanning to dental software, screen shots at 0:09 and 7:00 of YouTube video, https://www.youtube.com/watch?v=QONGdQ3QiFE, dated as uploaded Oct. 1, 2018 in 2 pages.
Jiang et al. Bending Process Analysis and Structure Design of Orthodontic Archwire Bending Robot. International Journal of Smart Home. vol. 7, No. 5 (dated 2013), pp. 345-352. http://dx.doi.org/10.14257/ijsh.2013.7.5.33.
Jiang et al. A Review on Robot in Prosthodontics and Orthodontics. Hindawi Publishing Corporation. Advances in Mechanical Engineering. Article ID 198748. Dated 2014. 11 pages.
Korean Intellectual Property Office (ISA/KR), International Search Report and Written Opinion of the International Searching Authority, dated Feb. 14, 2014, for PCT Application No. PCT/US2013/067560, filed Oct. 30, 2013, entitled Orthodontic Appliance with Snap Fitted, Non-Sliding Archwire.
Mahony, Derek, "How We Got From There to Here and Back". Dental Learning Hub (Capture of web page dated Jun. 24, 2013 downloaded from http://web.archive.org/web/20130624145806/http://www.dental-learninghub.com/Clinical/Orthodontics.aspx, downloaded Feb. 7, 2014).
Miller, R.J. et al. "Validation of Align Technology's Treat III™ Digital Model Superimposition Tool and Its Case Application". Orthodontic Craniofacial Res., dated 2003, vol. 6 (Suppl 1): pp. 143-149.
A ScanBox demo, https://www.youtube.com/watch?v=MsCfv2PDQ0o, screen shots at 0:08 and 0:19 of YouTube video, dated as uploaded May 5, 2019 in 2 pages.

(56) References Cited

OTHER PUBLICATIONS

SinodentalGroup, "Braces Bonding Teeth Gems Glue Light Cure Adhesive", https://sinodentalgroup.myshopify.com/products/sino-dental-group-orthodontic-brackets-glue-braces-bonding-light-cure-adhesive-kit?pr_prod_strat=use_description&pr_rec_id=0d0a6cdc9&pr_rec_pid=6687895355572&pr_ref_pid=6705886363828&pr_seq=uniform, dated as downloaded Jun. 7, 2023 in 12 pages.

Southern Maine Orthodontics, Virtual Orthodontic Treatment, https://southernmainebraces.com/virtual-orthodontic-treatment/, printed Jun. 7, 2022 in 3 pages.

Spini et al., "Transition temperature range of thermally activated nickel-titanium archwires", J Appl Oral Sci., dated Apr. 2014, vol. 22, No. 2, pp. 109-117.

SureSmile. 2013. About SureSmile. (Capture of web page dated Jun. 21, 2013 downloaded from http://web.archive.org/web/20130621031404/http://suresmile.com/About-SureSmile, downloaded Feb. 7, 2014).

Xia, et al. Development of a Robotic System for Orthodontic Archwire Bending. 2016 IEEE International Conference on Robotics and Automation (ICRA). Stockholm, Sweden, dated May 16-21, 2016. pp. 730-735.

Yang, Won-Sik, et al. "A Study of the Regional Load Deflection Rate of Multiloop Edgewise Arch Wire." Angle Orthodontist, dated 2001, vol. 7, No. 2, pp. 103-109.

International Search Report for International Application No. PCT/US2018/016293 dated May 10, 2018.

In Brace, Brush & Floss Easily with In Brace, dated as uploaded on: May 26, 2022, YouTube, Retrieved from Internet: https://www.youtube.com/watch?v=uAsxiBlbY4Y (Dated Year: 2022).

MEAW School, Introduction to MEAW (Multi-loop Edgewise Arch Wire), dated as uploaded On: Mar. 24, 2021, YouTube, Retrieved from Internet: https://www.youtube.com/watch?v=ne785jlzN Pg (Year: 2021).

Richard Gawel, Swift Health Systems Raises $45 Million to Finance Invisible Orthodontics, dated as published on: Dec. 4, 2019, dentistrytoday.com, Retrieved from Internet: https://www.dentistrytoday.com/products/swift-health-systems-raises-45-million-to-finance-invisible-orthodontics/ (Dated Year: 2019).

In Brace, What Is In Brace?—Integration Booster, dated as uploaded on: May 22, 2023, YouTube, Retrieved from Internet: https://www.youtube.com/watch?v=ANUPkCSfQo4 (Dated Year: 2023).

* cited by examiner

HYBRID ORTHODONTIC ARCHWIRES

REFERENCE TO RELATED APPLICATIONS

This application is a continuation of U.S. application Ser. No. 17/105,085, filed Nov. 25, 2020, which is a continuation of U.S. application Ser. No. 15/884,805, now U.S. Pat. No. 10,881,489, filed Jan. 31, 2018, which claims the benefit under 35 U.S.C. § 119 (e) as a non-provisional application of U.S. Prov. App. No. 62/452,802 filed on Jan. 31, 2017, which are hereby incorporated by reference in their entireties. Any and all applications for which a foreign or domestic priority claim is identified in the Application Data Sheet as filed with the present application are hereby incorporated by reference under 37 CFR 1.57.

BACKGROUND

Field of the Invention

This invention relates in some aspects to orthodontic appliances, including orthodontic brackets and archwires.

Description of Related Art

Orthodontic appliances are commonly used to correct misaligned teeth. There are many types of orthodontic appliances. However, each may have drawbacks, such as requiring too much time to prepare and/or install.

One type of orthodontic appliance is the pin and tube appliance. The pin and tube appliance can control the movement and position of each tooth in three-dimensional space. It can include an orthodontic archwire with a male "pin" that inserts into a female vertical "tube" that is attached to the tooth. The pin and tube do not move relative to each other. Interproximal loops can be placed in between the teeth to move the teeth to open or close spaces. However, the pin and tube appliance can present challenges, including:

- Custom bends and interdental loops may have to be bent manually in the archwire for the pins to fit into the vertical tubes and for the archwire to move the teeth to the desired location. This process may need to be performed manually by a human and may be very demanding and tedious.
- The male pin may need to be soldered onto the orthodontic archwire with a needed inclination. As the teeth move, the pins may need to be unsoldered and re-soldered to new locations. This may also be a very demanding and tedious manual process.
- The solder joint between the male pin and orthodontic archwire may break.
- The orthodontic archwire may be difficult to insert and remove from the patient because the locking mechanism may require bending the male insert over the tube to lock and un-bending the male insert from the tube to unlock.
- Stainless steel wires may be needed. Because of elastic limitations of stainless steel, many different size wires with different properties may need to be used for each case. This may complicate wire bending, pin soldering, and locking, and unlocking procedures when changing wires.
- The device may be ineffective in dealing with axial rotations of teeth.

Another type of orthodontic appliances is the edgewise appliance. An edgewise appliance may include orthodontic brackets (with rectangular slots) that are bonded onto each tooth. An archwire that is rectangular in cross-section may fit into rectangular slots in the orthodontic brackets, but cross-sections of different shapes may be used as well. However, the edgewise appliance can present problems, including:

- It may require significant custom wire bending along three axes (or three orders) due to differences in tooth size and tooth position. These axis may include in-out (first order bend), up-down (second order bend), and faciolingual inclination (3rd order bend).
- The wire may need to be tied to an orthodontic edgewise orthodontic bracket. This can be time consuming, especially if the brackets are behind the teeth, also known as lingual braces.
- Sliding the archwire with respect to the orthodontic bracket can require application of external forces. Frequent appointments may be required to ensure that these external forces do not overcorrect or undercorrect the amount of desired movement.
- This system may depend heavily on sliding between the orthodontic bracket and archwire to move teeth. However, the amount of sliding that can be achieved can be difficult to predict due to the unpredictable nature of the amount of friction to overcome. This can again require frequent monthly appointments to ensure that the tooth moves in the desired amount.

Another type of orthodontic appliances is the pre-adjusted, straight-wire appliance that uses nickel-titanium wires. This appliance can minimize the amount of archwire bending that is required in edgewise appliances. The shape memory capability, superelasticity, and lower modulus of elasticity features of shape memory alloys can lower the amount of force delivered to the teeth and significantly reduce the pathologic lesions as a result of heavy force use from rigid stainless steel wires. The large range of movement for some of shape memory alloy archwires can reduce the number of archwires required for treatment and, as such, reduce the number of activation appointments that are needed.

However, the pre-adjusted straight-wire appliance can present challenges. For example, considerable time may be required to tie the archwire into the orthodontic bracket, especially when lingual braces are used. The appliance may also still rely heavily on sliding the orthodontic bracket relative to the archwire to open and close space. To overcome the unpredictable amount of friction that is generated, frequent monthly appointments may still be required to ensure that the correct amount of movement is achieved.

Another type of orthodontic appliance uses self-ligating orthodontic brackets. These may reduce the amount of time and effort required to tie a wire into an orthodontic straight-wire appliance. Various types of doors and latches may be provided to replace tying the orthodontic wire. These doors and latches can make it easier to deliver and change orthodontic archwires. They can also eliminate the unnecessary tying and untying of archwires at appointments when the archwire does not need to be changed. Self-ligating orthodontic brackets can also provide a metal-to-metal interface between the orthodontic slot and the wire, reducing the amount of friction when moving teeth. However, self-ligating orthodontic brackets can present problems, including:

- Self-ligating orthodontic brackets can sacrifice torque control of the teeth because of a high degree of orthodontic slop (slot play) that can be present between the orthodontic slot and the archwire.

Self-ligating orthodontic brackets may rely heavily on sliding the orthodontic bracket relative to the archwire to open and close space. Thus, frequent monthly appointments can still be required to ensure that the correct amount of movement is achieved.

Self-ligating orthodontic brackets can be bulkier than other types of orthodontic brackets. This can make control of the teeth much more difficult when using the orthodontic brackets on the lingual surface (behind the teeth) because there may be less interdental space between the orthodontic brackets, resulting in a much more rigid wire that can be harder to control.

Self-ligating orthodontic brackets can have several moving parts that can break under wear from occlusal forces in the mouth or from normal use of the appliance.

CAD/CAM technology can also be used in connection with orthodontics. This technology can be used to create an expected desired end result prior to the starting of orthodontic treatment. Customized wires and orthodontic brackets can be designed based on the expected desired end result of the orthodontic treatment to reduce the amount of doctor intervention required at each appointment. However, using CAD/CAM technology may not overcome all of the problems associated with the orthodontic appliances, such as:

These customized appliances can rely heavily on sliding the orthodontic bracket relative to the archwire to open and close space. Thus, frequent appointments may still be required to ensure that adequate force is delivered to achieve sufficient tooth movement.

Customized orthodontic brackets can also be difficult to tie in, especially when placed on the lingual surface of the teeth.

Customized self-ligating orthodontic brackets can be bulky, difficult to control, and damage-prone.

SUMMARY

In some embodiments, disclosed herein are hybrid orthodontic archwires that can include varying cross-section shapes, sizes, and/or material properties. The archwire may be divided into two or more sections comprising in some embodiments the portion of the archwire that is inserted and ligated to an orthodontic bracket, which will be referred to as the bracket-archwire section, and the portion of the archwire that is interproximal and not inserted into an orthodontic bracket, which will be referred to as the interproximal archwire section. These two sections can alternate with each other on an archwire, and each section in these alternating sections of the archwire may be a different cross-section shape, size, and/or material resulting in numerous hybrid archwire combinations. Any cross-sectional shape, size, and/or material may be used in a hybrid archwire.

In some embodiments, the hybrid archwire may include uniform or non-uniform patterns of varying cross-section shape, size, and/or material. In addition, some embodiments may feature different bends in the bracket-archwire section and/or in the interproximal archwire section. These bends may include a teardrop, U, V, rectangular, boot, and/or any other shape. Both sections of the archwire may also maintain a straight shape.

The hybrid archwires disclosed herein or portions thereof may comprise features as disclosed in U.S. Pat. No. 9,427,291 to Khoshnevis et al., issued on Aug. 30, 2016 and entitled "Orthodontic Appliance with Snap Fitted, Non-Sliding Archwire," or as disclosed in U.S. Patent Publication No. 2017/0296304 to Tong et al., published on Oct. 19, 2017 and entitled "Orthodontic Appliance with Non-Sliding, Tied Archwire," each of which is hereby incorporated by reference in its entirety. The hybrid archwires disclosed herein or portions thereof may further be configured to be used with orthodontic brackets disclosed in those same publications.

In one aspect of the invention, disclosed herein is a hybrid archwire for orthodontic treatment. The hybrid archwire includes a first section of archwire configured to couple to a first plurality of orthodontic brackets having archwire slots for receiving the archwire and a second section of archwire having one or more different structural properties from the first section of archwire and configured to couple to a second plurality of orthodontic brackets having archwire slots for receiving the archwire. The first section of archwire is configured to slide relative to the first plurality of orthodontic brackets when received in the archwire slots of the first plurality of orthodontic brackets. The second section of archwire is configured to provide greater resistance to sliding in a medial and distal direction relative to the second plurality of orthodontic brackets when received in the archwire slots of the second plurality of orthodontic brackets than the first section of archwire.

In some embodiments, the second section of archwire is configured to positively prevent sliding in a medial and distal direction relative to the second plurality of orthodontic brackets when received in the archwire slots of the second plurality of orthodontic brackets. The hybrid archwire may have two second sections along distal portions of the archwire and a single first section positioned between the two distal second sections. The two second sections may be configured to be coupled to posterior teeth of a dental arch and the single first section may be configured to be coupled to anterior teeth of the dental arch. The second section of archwire may include a plurality of male connectors. Each of the plurality of male connectors may be configured to mate with an orthodontic bracket from the second plurality of orthodontic brackets in a manner that prevents sliding. The male connectors may have bends formed in the second section of archwire. The male connectors may be configured to prevent rotation of the second section of archwire within the archwire slots of the second plurality of brackets. The second section of archwire may have at least one interproximal bend configured to exert a force on at least one adjacent orthodontic bracket when coupled to the second plurality of orthodontic brackets. The second section of archwire may have one interproximal bend between every adjacent pair of male connectors. The interproximal bend may be configured to exert a force on the adjacent orthodontic brackets when coupled to the second plurality of orthodontic brackets. The second section of archwire may have a plurality of interproximal bends configured to be positioned between every adjacent pair of teeth of the dental arch along which the second section is configured to attach.

The second section of archwire may have a round cross-sectional shape. The second section of archwire may have a non-round cross-sectional shape. The first section of archwire may have a round cross-sectional shape. The first section of archwire may have a non-round cross-sectional shape. The first section of archwire and the second section of archwire may have different cross-sectional shapes. The diameter or thickness of the second section of archwire may be larger than the diameter or thickness of the first section of archwire. The second section of archwire may have a coating configured to resist sliding in a medial and distal direction relative to the second plurality of orthodontic brackets when received in the archwire slots of the second plurality of orthodontic brackets. The first section of archwire may have a coating configured to promote sliding in a medial and distal direction relative to the first plurality of orthodontic brackets when received in the archwire slots of the first plurality of orthodontic brackets. The first section of archwire may include an interproximal bend. The interproximal bend within the first section of archwire may be configured to be positioned between two adjacent orthodontic brackets from the first plurality of orthodontic brackets. The first section of archwire may comprise a first material and the second section of archwire may comprise a second material different from the first material. The second material may be a shape memory material.

In some embodiments, an orthodontic appliance may include the hybrid archwire and the first plurality of orthodontic brackets and the second plurality of orthodontic brackets. The second section of archwire may be better matched in size and shape to the archwire slots of the second plurality of orthodontic brackets than the first section of archwire is matched in size and shape to the archwire slots of the first plurality of orthodontic brackets.

In a further aspect of the invention, disclosed herein is an archwire that is split into bracket-archwire sections and interproximal archwire sections. The bracket-archwire section is the portion of the archwire inserted into and ligated to the brackets, and the interproximal archwire section is the portion of the archwire that is in the interproximal region and not engaged with the bracket. Each section varies in one or more of its archwire cross-section shape, size, and/or material properties.

In some embodiments, there is a uniform pattern of alternating cross-section shapes, sizes, and/or materials in the bracket-archwire sections and interproximal archwire sections. In some embodiments, there is a non-uniform pattern of cross-section shape, sizes, and/or materials in the bracket-archwire sections and interproximal archwire sections. Bends of any shape may be made in any of the archwire sections.

In a further aspect of the invention, disclosed herein is a hybrid archwire having a plurality of bracket-archwire sections and a plurality of interproximal archwire sections. The plurality of bracket-archwire sections are configured to be operably connected to orthodontic brackets. Each of the interproximal archwire sections may be interspersed between two bracket-archwire sections. The bracket-archwire sections have at least a first cross-sectional shape, size, and/or material property and the interproximal-archwire sections have at least a second, different shape, size, and/or material property.

In some embodiments, the bracket-archwire sections may have a first cross-sectional shape and the interproximal-archwire sections may have a second cross-sectional shape. The first cross-sectional shape may be round and the second cross-sectional shape may be non-round. The non-round cross-sectional shape may be rectangular. The non-round cross-sectional shape may be square. The bracket-archwire sections may comprise at least a first material and the interproximal-archwire sections may comprise at least a second different material. The first material may comprise stainless steel. The first material may comprise titanium. The second material may comprise a nickel-titanium alloy.

In a further aspect of the invention, disclosed herein is a method of moving teeth comprising providing a single continuous customized archwire, positioning the single continuous archwire with respect to the dental arch, and activating the archwire. The archwire is provided in a first configuration created from a virtual set-up utilizing image data from a patient's teeth and configured to move the patient's teeth to a pre-determined desired configuration. The archwire has a first section and a second section. The first section has a plurality of male structures and a plurality of interproximal structures with respect to the patient's teeth. Each male structure corresponds to each and every tooth of the first section and only a single interproximal structure is between each and every male structure of the first section. Each interproximal structure corresponds to an interdental space in between each and every tooth of a first portion of the dental arch. The second section corresponds to at least two of the patient's teeth of a second portion of the dental arch and has a continuous curve devoid of any male structures or interproximal structures. Activating the archwire comprises deflecting the archwire from its first configuration to a second configuration and attaching each male loop of the plurality of male loops to corresponding brackets attached to each and every tooth of the dental arch in the first section. Activating the archwire allows the interproximal looped structures to impart forces on the teeth with respect to the teeth in the first section, thereby moving the teeth in the first section toward the pre-determined desired configuration as the archwire changes from the second configuration back to the first configuration. The archwire does not slide with respect to the brackets in the first section when each of the male loops are attached to the corresponding brackets in the first section. The archwire can slide with respect to brackets in the second section.

Activating the archwire may lead to mesio-distal tooth movement for at least some of the teeth. Activating the archwire may lead to occlusal-gingival tooth movement for at least some of the teeth. Activating the archwire may lead to facio-lingual tooth movement for at least some of the teeth. The interproximal structures may have a loop shape. The interproximal structures may have a boot shape or a tear shape. The brackets may include self-ligating brackets, twin brackets, single-wing brackets, and/or ribbon arch brackets. The archwire may comprise a shape memory material.

BRIEF DESCRIPTION OF THE DRAWINGS

These drawings are illustrative embodiments and do not present all possible embodiments of this invention.

DETAILED DESCRIPTION

Figure 1:
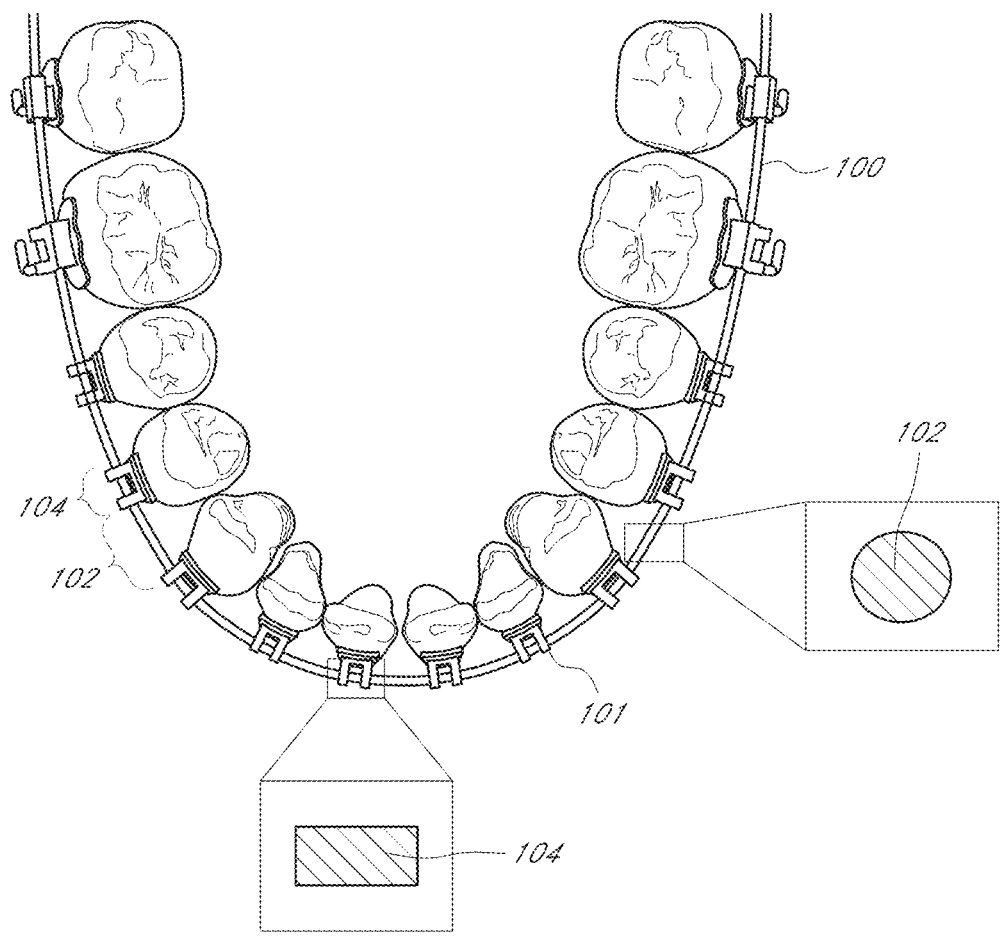
FIG. 1 illustrates an embodiment of an entire hybrid archwire with a uniform alternating pattern of rectangular cross-sections for all bracket-archwire sections and round cross-sections for all interproximal archwire sections.

Orthodontic treatment involves the use of orthodontic brackets and archwires to correct malocclusion of the teeth. The brackets are bonded to the teeth and the archwire is inserted into and ligated with the brackets. The ligated archwire can then exert forces and moments that move the teeth into their correct positions.

Archwires exist in several different forms and each archwire can have a different cross-section shape, size, and/or material. Traditionally, archwires have a consistent cross-section shape, size, and material properties that spans the entire length of the archwire. These different forms of uniform, consistent archwires each have their own indications for different stages of tooth movement in orthodontic treatment. Thus, in order to make all of the necessary tooth movements to finish treatment, typically a series of different archwires of varying properties is needed which can be a step-wise and inefficient process. A possible way to decrease the amount of distinct archwires needed and to correct multiple tooth position issues simultaneously, making treatment more efficient, would be to make hybrid archwires that can combine these different archwire properties into a single archwire. In practice, this has been demonstrated with the Hills Dual-Geometry Wire (SPEED Orthodontics) which has a round posterior cross-section and a square anterior cross-section allowing for both space closure and anterior retraction. However, the cross-section of this wire does not change from the bracket zones to the interproximal (or inter-bracket) zones within each respective anterior or posterior section. Furthermore, while the Hills Dual-Geometry Wire still has improved, it still possesses limited variability in its archwire properties and limited functionality, so further improvements in archwire design are still needed.

The size (e.g., cross-sectional area or diameter) and material of the archwire directly impact the wire stiffness and load deflection rate, and the size also determines the amount of slot play (or fit) the archwire has in a bracket slot. The cross-sectional shape of an archwire plays a large role in the bendability, comfort, and torque expression of the archwire. A rectangular or square cross-section, unlike a round cross-section, can allow, in some cases, for torque expression in a bracket with a rectangular slot. Round cross-section archwires can have less friction than a rectangular wire and can result in advantageous sliding mechanics in which the archwire slides in a medial or distal direction relative to one or more brackets. Round archwires are generally more comfortable for the soft tissue and can be easier to bend into loops and other shapes compared to rectangular archwires. In addition to the more common rectangular, square, and round cross-section shapes, other cross-section shaped archwires have been developed such as D-shaped, trapezoidal, triangular, ovoid, and other cross-sectional shapes. Each cross-section shape has their pros and cons and are uniquely suited for different aspects of orthodontic tooth movement. However, because archwires either have generally consistent cross-sectional shapes, sizes, and/or materials, often only certain tooth movements and bends can be made with each archwire, limiting efficiency in orthodontic treatment.

Disclosed herein are hybrid archwires which have varying properties along the length of the archwire. In some embodiments, different portions of the archwire may possess different properties depending on which tooth or sets of teeth the archwire is configured to be positioned across. The archwire properties may affect the orthodontic treatment via the interaction of the archwire and the orthodontic brackets, bonded to one or more teeth, which the archwire connects to. In some embodiments, different portions of archwire may possess different properties depending on whether the portion of the archwire is configured to be attached or ligated to an orthodontic bracket or another component of an orthodontic appliance, whether the portion of the archwire is configured to be bent into a shape or loop (e.g., an interproximal bend), whether the portion of the archwire is configured to transmit a smaller or larger amount of force (e.g., a translational force on an adjacent tooth), whether the portion of the archwire is configured to transmit a torque, and/or whether the portion of the archwire is configured to come into contact with any part of the mouth tissue. The hybrid archwire may have at least two sections having at least partially different properties.

In some embodiments, the archwire may comprise alternating sections, including a plurality of first sections and a plurality of second sections. The alternating sections may form a repeating pattern along the length of the archwire. The first sections may comprise bracket portions of the archwire configured to be attached to, ligated to, or otherwise coupled to an orthodontic bracket. The second sections may comprise portions of the archwire not configured to be attached to, ligated to, or otherwise coupled to an orthodontic bracket. The second sections may extend between the first sections. The second sections may comprise inter-bracket sections or interproximal sections of the archwire. The alternating pattern may be regular (uniform) or irregular (non-uniform). For example, in regular patterns, each of the first sections may have the same length and each of the second sections may have the same length. In regular patterns, each of the first sections may have identical or substantially similar properties and/or each of the second sections may have identical or substantially similar properties. Irregular patterns may be any pattern that is not regular. Some patterns may be partly regular and partly irregular depending on the property of the archwire. The pattern of first sections may be regular and the pattern of the second sections may be irregular or vice-versa. Portions of the alternating pattern may be regular and portions of the alternating pattern may be irregular. In some embodiments, the alternating pattern may extend the entire length of the archwire. In some embodiments, the alternating pattern may extend only along a portion of the length of the archwire. For example, the pattern may extend only across a length of the archwire corresponding to a subset of teeth receiving orthodontic treatment. In some embodiments, the repeating pattern may comprise more than two type of sections, such as first, second, and third sections. The pattern may comprise any order or arrangement of the plurality of sections.

In some embodiments, the archwire may have sections that extend across a portion of the archwire corresponding to multiple teeth. For example, a section of archwire having a variable property may extend across distal or posterior teeth, across anterior or medial teeth, across the left teeth, across the right teeth, across the molar teeth, across the biscuspid teeth, across the bicuspid and cuspid teeth, across the incisors, across any adjacent combinations, or across any subset of teeth within those sections. In general, the sections may extend across one tooth, two teeth, three teeth, four teeth, five teeth, six teeth, seven teeth, eight teeth, nine teeth, ten teeth, eleven teeth, twelve teeth, thirteen teeth, fourteen teeth, fifteen teeth, a portion of a tooth, a portion of two teeth, a portion of the dental arch (16 teeth), or any portion of a subset of adjacent teeth, or ranges incorporating any two of the aforementioned values. Accordingly, transitions between two sections having different archwire properties may generally be positioned over the third molar, between the third molar and the second molar, over the second molar, between the second molar and the first molar, over the second bicuspid, between the first bicuspid and the second bicuspid, over the first bicuspid, between the first bicuspid and the cuspid (canine tooth), over the cuspid, between the cuspid and the lateral incisor, over the lateral incisor, between the lateral incisor and the central incisor, over the central incisor, or between left and right central incisors. In some embodiments, the archwire may transition sharply between two adjacent sections of different properties. In some embodiments, the archwire may transition gradually between two adjacent sections or between two or more properties forming a transition section. The transition section may comprise a length the same as the lengths described above and may be positioned over any of the same teeth.

In some embodiments, the archwire may have multiple levels of sectioning or patterning. For instance, the archwire may comprise two distal or posterior sections and an intermediate anterior or medial section. Any or all of the posterior or anterior sections may comprise subsections along the length of the section, such as an alternating pattern of bracket sections and interproximal sections, as described elsewhere herein. In some embodiments, sections may overlap. For example, the archwire may comprise a left section and a right section. The right section and the left section may possess differences in a first archwire property (e.g., diameter). Furthermore, the archwire may comprise a third section that extends over the anterior teeth and fourth and fifth sections that extend over the posterior teeth. The third section may possess a different second archwire property (e.g., cross-sectional shape or stiffness) from the fourth and fifth sections. Alternatively, the third section may comprise an alternating pattern of a second archwire property (e.g., cross-sectional shape), such as between bracket sections and interproximal sections, while the fourth and fifth sections comprise constant properties over the length of the sections.

Figure 2:
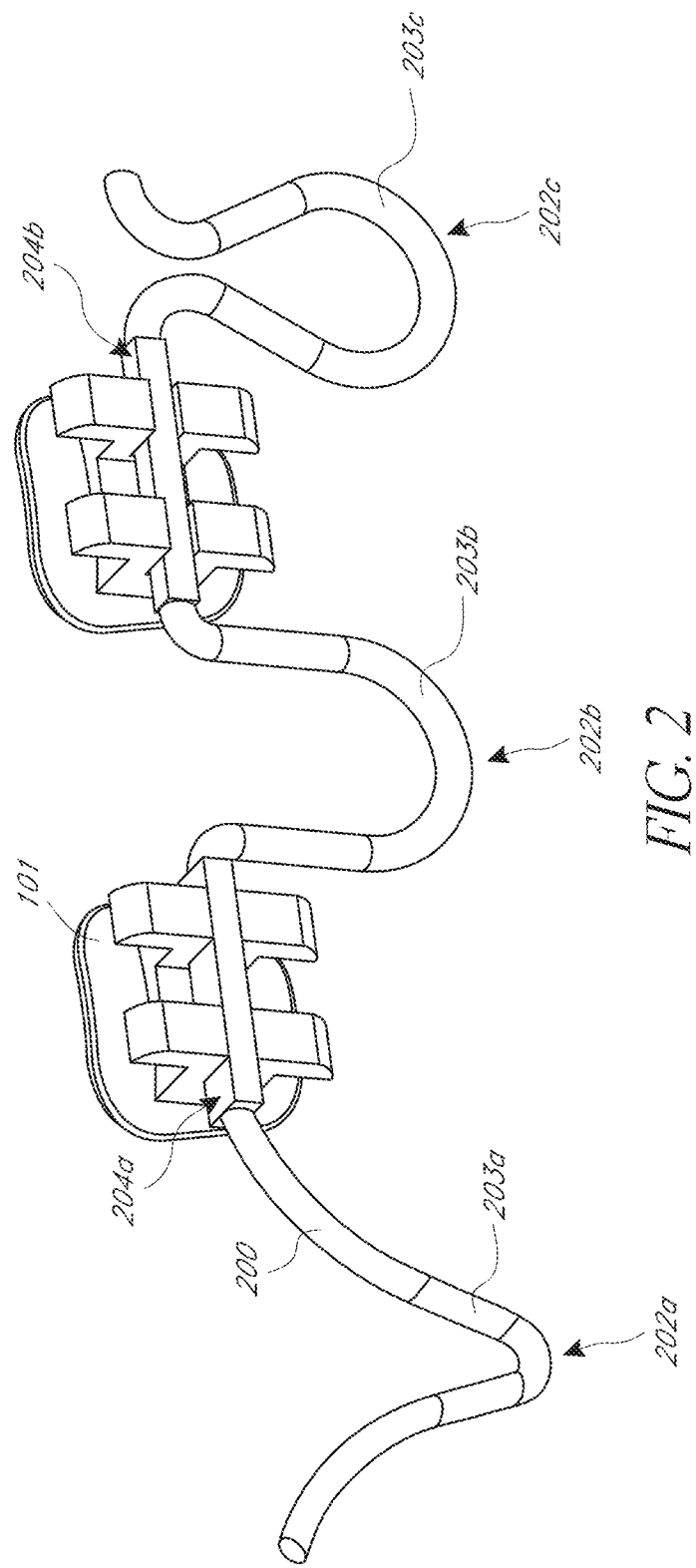
FIG. 2 illustrates an embodiment of a hybrid, non-uniform archwire segment with a square and rectangular cross-section for the bracket-archwire section and a round cross-section for the interproximal archwire section that is bent into a V, U, and teardrop-shaped loop. The round cross-sections also are different sizes and materials.

In some embodiments, disclosed herein are improved archwire designs that allow for more efficient tooth movement. FIG. 1 illustrates an embodiment of an entire hybrid archwire 100 that has a uniform alternating pattern which alternates between a first cross-section (e.g., a round cross-section) archwire in the interproximal archwire section 102 and a second cross-section, different from the first cross-section, (e.g., a rectangular cross-section) in the bracket-archwire section 104 configured for coupling to brackets 101. Varying the cross-sectional shapes in this alternating pattern allows for torque expression in the bracket-archwire sections 104 and improved bendability and comfort in the interproximal archwire sections 102. In some embodiments, the archwire 100 can be a single, continuous archwire. Aside from the cross-sectional geometries, in some embodiments, the bracket-archwire sections 104 can be generally linear/straight while the interproximal archwire sections 102 can be generally non-linear and offset from the bracket-archwire sections, such as a bend, loop, or other configurations (FIG. 2). In some embodiments, about or at least about 2, 3, 4, 5, 6, 7, 8, 9, 10, 11, 12, 13, 14, 15, or 16 bracket-archwire sections 104 and/or interproximal archwire sections 102 can be included in a single archwire, or ranges including any two of the aforementioned values. In some embodiments, all bracket archwire sections 104 may have identical cross-sections (e.g., rectangular), sizes, and materials. In some embodiments, all interproximal archwire sections 102 may have identical cross-sections (e.g., rectangular), sizes, and materials. In some embodiments, each individual archwire section can have different diameters, lengths, widths, thicknesses, degrees of stiffness, materials (or proportions of materials), or other properties. In some embodiments, some sections can be coated (e.g., with a smooth atraumatic surface, such as silicone or a polymer for example), and other sections can be non-coated.

FIG. 2 illustrates an embodiment of a hybrid archwire segment 200 with a non-uniform pattern. In this hybrid archwire segment 200, there is variation in the cross-section shape, size, and material demonstrating the numerous combinations possible with hybrid archwires. In this embodiment, there are a plurality of cross-sections in a rectangular and square cross-section shape for the bracket-archwire sections and round cross-sections of varying size and materials in the interproximal archwire sections. For example, bracket archwire section 204a comprises a rectangular cross section, bracket archwire section 204b comprises a square cross-section, and interproximal archwire sections 202a, 202b, and 202c comprise substantially circular cross-sections. In some embodiments, adjacent archwire sections of different cross-sections may have substantially the same thickness or diameter. For instance, the circular cross-section of interproximal archwire section 202b may have a diameter substantially equal to the height and width of the square cross-section of bracket archwire section 204b. In some embodiments, adjacent archwire sections may have different diameters or thicknesses, in one or more dimensions. In some embodiments, the size of similarly shaped archwire sections may be different. For example, in FIG. 2, the interproximal archwire section 202a is approximately 0.014 inches, and the interproximal archwire sections 202b and 202c are approximately 0.016 inches. The interproximal bends 203a, 203b, and 203c in the interproximal archwire sections 202a, 202b, 202c of the archwire 200 of this embodiment are V, U, and tear-drop shaped, respectively, but they may be any shape. As illustrated, the respective sections can be made of 2, 3, or more different materials, including but not limited to nickel-titanium (202a), stainless steel (202b), non-nickel titanium such as beta-titanium (202c), or titanium-molybdenum alloy for example. Nickle-titanium (NiTi) alloys (nitinol) may include, for example, between 1 to 10% copper (Cu), cobalt (Co), niobium (Nb), palladium (Pd), or combinations thereof. Nickel-free Beta Titanium wires may include, for example, primary elements of titanium (Ti), molybdenum (Mo), zirconium (Zr) and 0-5% of additional elements selected from tin (Sn), aluminum (Al), chromium (Cr), vanadium (V), and niobium (Nb), or combinations thereof. The bracket archwire sections 202a, 202b may be secured to brackets 101 by ligation bands (e.g., elastic bands or metallic bands) wrapped around the projecting tie wings of the bracket 101 as is known in the art (not shown).

The interproximal bends or loops may be configured to exert forces on the adjacent teeth. For example, an interproximal bend that is stretched or opened when the archwire 200 is applied to the dental arch may elastically pull the two adjacent teeth together (in a mesio-distal movement) and may be useful for closing a space between adjacent teeth. Likewise, an interproximal bend that is compressed when applied to the dental arch may elastically push the two adjacent teeth apart, which may be useful for opening of a space between overlapping teeth. For occlusal-gingival tooth movement, if the adjacent teeth are not at the same level, an archwire inserting into an orthodontic bracket 101 may cause connecting archwire legs and interproximal bends to deflect in a slanted manner, which may cause the archwire to be activated, leading to tooth correction in the occlusal-gingival direction. For facio-lingual tooth movement, archwire insertion into an orthodontic bracket 101 may cause the wire to be pushed away from its original position, which may cause the archwire to be activated, leading to tooth correction in the facio-lingual direction. In general, the relative displacement of the two legs of the interproximal bend when elastically deformed may apply a translational force on one or both of the adjacent teeth in 1, 2, or 3 of three dimensions (mesial-distal, lingual-facial, gingival-occlusal) in either direction. The force exerted on the adjacent tooth or teeth by the interproximal bend may result in a moment or torque being applied to the tooth or teeth in any 1, 2, or 3 of three dimensions (about a mesial-distal axis, about a lingual-facial axis, about a gingival-occlusal axis) in either direction. The resultant force and/or the moment exerted on a tooth may depend on the combination of forces exerted from both the mesial-positioned and distal-positioned interproximal archwire section. In some embodiments, some teeth may have an interproximal bend positioned on only one side of the teeth.

The interproximal bend may be formed substantially in a single plane (the medial and distal legs of the bend may be coplanar), as shown in FIG. 2, or the legs may not be coplanar. In some embodiments, the interproximal bend may be inclined (e.g., in an unbiased configuration), such as in a lingual direction on a lingual orthodontic appliance or such as in a facial direction on a facial (labial or buccal) appliance. The interproximal bend may point generally in an occlusal direction or in a gingival direction. The interproximal bends on a single archwire may point in the same or different directions. The section of archwire forming the interproximal bend may comprise uniform properties or the properties may vary along the length of the bend. For example, the one leg of the bend may have a larger cross-section and/or be more rigid than the other leg, which may affect the distribution of force to the two adjacent teeth when the interproximal bend is deformed.

In some embodiments, the archwire 200 may comprise a shape-memory material, at least in one or more of the interproximal sections comprising an interproximal bend. The shape memory section may be programmed with a memorized conformation. A shape memory archwire can be plastically deformed to a degree and still return to its memorized conformation, similar to elastic deformation. Shape memory archwires may advantageously allow for the correction of malocclusion with the use of less force on the teeth than for non-shape memory archwires. The interproximal bends may be specifically configured (e.g., customized) to provide precise forces and/or moments on the adjacent teeth. The customized nature of an archwire may result in an archwire which is asymmetric, such as around a midline configured to be aligned with the middle of a dental arch. The archwire or sections of the archwire may be configured in an original or non-deformed shape reflecting an expected finished alignment of the teeth. When the deformed or deflected archwire returns to its original shape as the teeth move to release the stress within the deformed archwire, the teeth may be moved into a final expected alignment or a final expected alignment for a particular stage of treatment (e.g., before switching out the archwire). An archwire may be activated by deflecting it away from its default position and inserting into an orthodontic bracket that is bonded to a tooth. When this elastic deflection occurs, the archwire may exert a reaction force in the direction that returns the archwire to the designed configuration, thereby transferring forces to the tooth and causing orthodontic tooth movement. This type activation may be self-activating and self-limiting because it may not require use of external forces such as power chain and coil springs to move the teeth. This type of activation may also be self-limiting because the archwire may only exert forces that return the archwire to its original shape, negating the need for frequent appointments.

The use of a rectangular bracket archwire section (204a, 204b) in a rectangular bracket archwire slot, as shown in FIG. 2, may be particularly advantageous in exerting torque on a bracket 101, particularly around a mesial-distal axis of the archwire 200 since the rectangular archwire will not slip relative to the rectangular bracket archwire slot it sits in. The fit of the archwire bracket section 202 within the archwire slot may also affect the transfer of force or torque to the bracket 101. A closer or tighter fit between the slot and the archwire may result in more friction and less slippage (slot play) which may result in more efficient transfer of forces from the archwire 200 to the bracket 101. The fit or slot play may be a function of the match between the size and/or shape of the bracket archwire section 202 and bracket archwire slot. More evenly matched sizes and shapes will tend to result in more friction and less slot play. Rounder bracket archwire sections may generally lead to less friction and more slot play. The ligation bands (not shown) may increase the friction between the archwire and bracket slots, depending on the tightness of the band, which may be variable and somewhat unpredictable. In some instances, the amount of sliding of the archwire relative to the bracket 101 in the mesial-distal direction may conversely increase as friction is decreased and slot play is increased.

Sliding mechanics may be necessary in some implementations as teeth gradually move and the tension in the archwire decreases to adjust the positioning of one or more brackets 101 along the length of the archwire so that the tension is redistributed accordingly (e.g., uniformly distributed across several teeth). Otherwise, portions of the archwire between non-sliding brackets may develop "slack" as the teeth are repositioned. The amount and/or rate of sliding for one or more teeth may be particularly calculated in designing the orthodontic treatment. Sliding mechanics may generally be more important for straight archwires, such as in FIG. 1, or sections of straight archwire, where most or all of the force applied to the teeth is a result of the tension in the archwire 100, which is tensioned between two anchored points (e.g., molar brackets). Friction between the archwire and intermediary brackets (e.g., between the molar bracket anchors) may somewhat alter the otherwise uniform distribution of tension in the archwire 100. Sliding mechanics may generally be less needed in archwires, or sections of archwire, comprising interproximal bends. In some embodiments, the forces exerted on adjacent teeth by interproximal bends may be the sole or primary source of force on the adjacent teeth. Brackets adjacent to interproximal bends which do not slide relative to the archwire, or which resist sliding, may be beneficial by providing a counterforce necessary for the interproximal bend to localize its exertion of force on that bracket.

In some embodiments, a bracket archwire section and an orthodontic bracket may be configured to attach to each other in a configuration that positively prevents sliding between the two. The archwire may be "fixed" to one or more orthodontic brackets in a non-sliding manner. In some embodiments, the archwire may be fixed to an orthodontic bracket via a male connector. The male connector may be an integral part of the archwire. For example, the bracket archwire section may be configured with a male connector.

Figure 3:
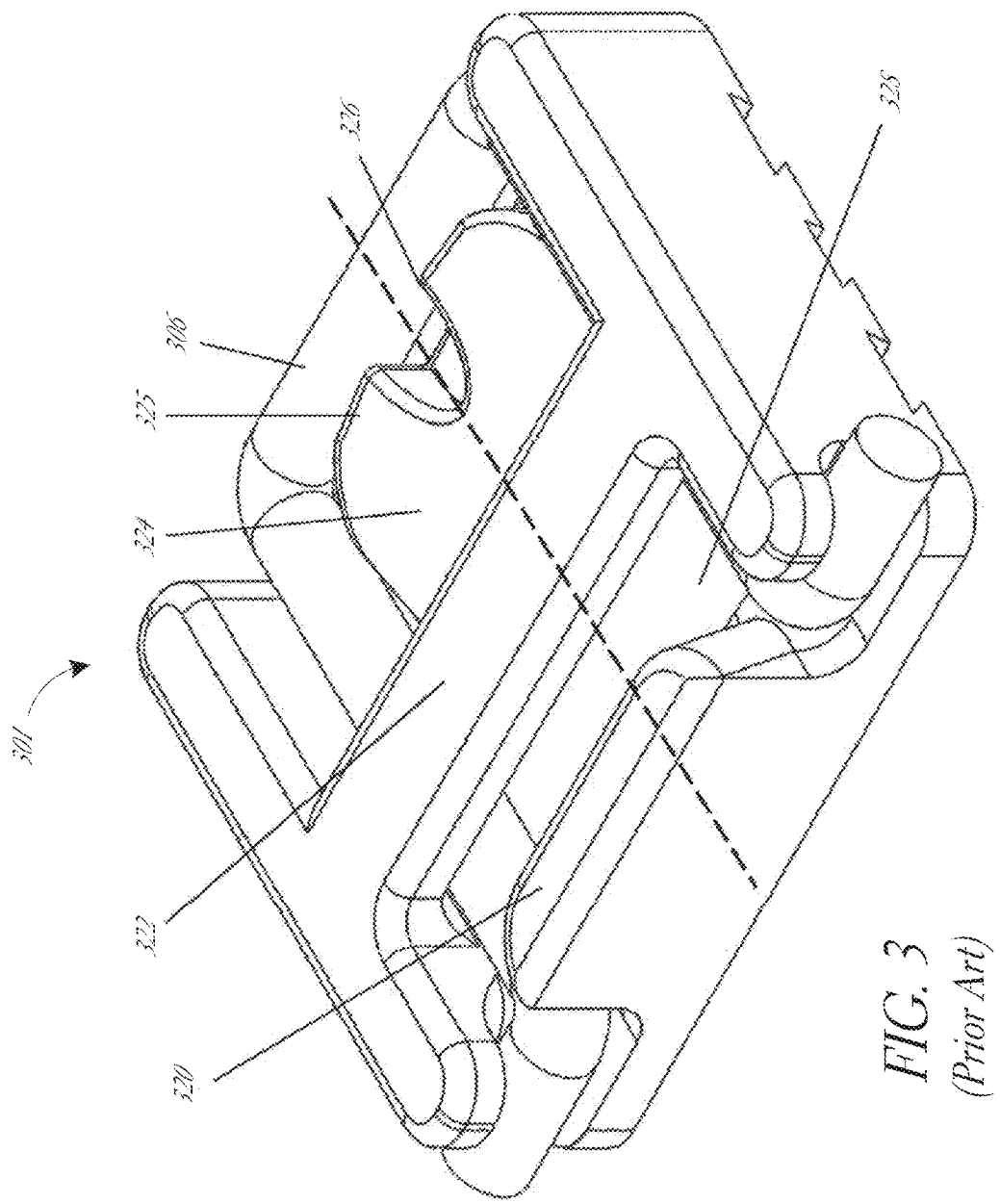
FIG. 3 illustrates an embodiment of an archwire comprising a male connector locked into an orthodontic bracket in a manner which prevents sliding of the archwire relative to the bracket.

The male connector may project away from the mesial-distal axis of the archwire. In some embodiments, the male connector and/or an interproximal connector may be formed as a bend (e.g., a U-shaped bend, a rectangular shaped bend, an S-shaped bend, a V-shaped bend, a tear-drop shaped bend, a T-shaped bend, a boot-shaped bend, etc.) similar to an interproximal bend. The male connector may be formed from a section of archwire having a round (e.g., circular) cross-section or another shaped cross-section (e.g. rectangular). In some embodiments, the male connector may be an attachment, such as a cylindrical tube member attached around the archwire. FIG. 3 shows an example of an archwire 300 comprising a male connector 306 and a corresponding orthodontic bracket 301 for receiving the male connector 306. In some embodiments, the male connector 306 may be locked into the bracket 301, such as by a mechanical mechanism. In some implementations, the male connector 306 may snap into a locked position within the bracket 301 under pressure. The male connector 306 may be unable to slide in a mesial or distal direction with respect to the orthodontic bracket 301 after being locked in the orthodontic bracket 301. A manual unlocking action may allow the male connector 306 to disengage from the orthodontic bracket 301. Neighboring interproximal bends may face in the same or the opposite direction as the male connectors 306.

Each male connector 306 may be configured in a shape so as to match a shape of a corresponding archwire slot in the orthodontic bracket 301. Each male connector 306 may have two substantially parallel side bars and an arc portion. An archwire leg may extend from each of the sidebars into the interproximal section of the archwire. The archwire legs of the male connector 306 may be parallel to the bite plane when they are left in a passive position. The directions of the male connectors 306 may reflect the mesio-distal angulation and/or facio-lingual inclination of the teeth in the expected finishing setup of the teeth. The male connectors 306 may point to the occlusal direction when the orthodontic brackets are oriented in such a way as to allow the archwire 300 to be inserted from the gingival to the occlusal direction. Users may instead wish to insert the archwire 300 from the occlusal to the gingival direction, in which case the male connectors 306 may point to the gingival direction and the orthodontic brackets may be bonded to the tooth 180 degrees from the orientation needed for the insertion in the occlusal description. Each orthodontic bracket 301 may be bonded to a tooth, oriented so that it has a mesial side towards the midline of the dental arch; a distal side that is away from the midline of the dental arch; a gingival side that is toward the gingivae; an occlusal side that is toward the biting surface of the teeth; a tooth side that is toward the tooth; and a non-tooth side that is away from the tooth.

The orthodontic bracket 301 shown in FIG. 3 comprises a central stop 320 configured to sit between the archwire legs of the male connector 306, a central body 324 configured to sit between the medial and distal sidebars of the male connector 306, a bridge 322 configured to be positioned over the top of the male connector 306, and a floor 328. As shown in FIG. 3, in some embodiments, the central body 324 may be a springboard which is pressed downward to insert the male connector 306. The springboard when unbiased may lock the male connector 306 within the bracket 301. The top edge 325 of the springboard may rise to a height indicated by 326 and thereby prevent the arc of the male connector from sliding downward. The central stop 320 and/or the central body 324 may prevent the side bars of the male connector 306 from being compressed together under compression. The bridge 322 may prevent the male connector 306 from rotating around the mesial-distal axis of the archwire 300 and thereby may facilitate the transfer of torque around that axis to the bracket 301.

Bracket archwire sections comprising male connectors may offer several advantages. There may be superior mesio-distal angulation and facio-lingual inclination orthodontic control because the vertical male connector may offer a longer arm for coupling forces to the orthodontic bracket when compared to the rectangular dimensions of an edgewise appliance. Moreover, the spread of the two parallel side bars of the male connector may make them function like a twin orthodontic bracket in providing a force couple in dealing with any axial rotation.

Figure 4:
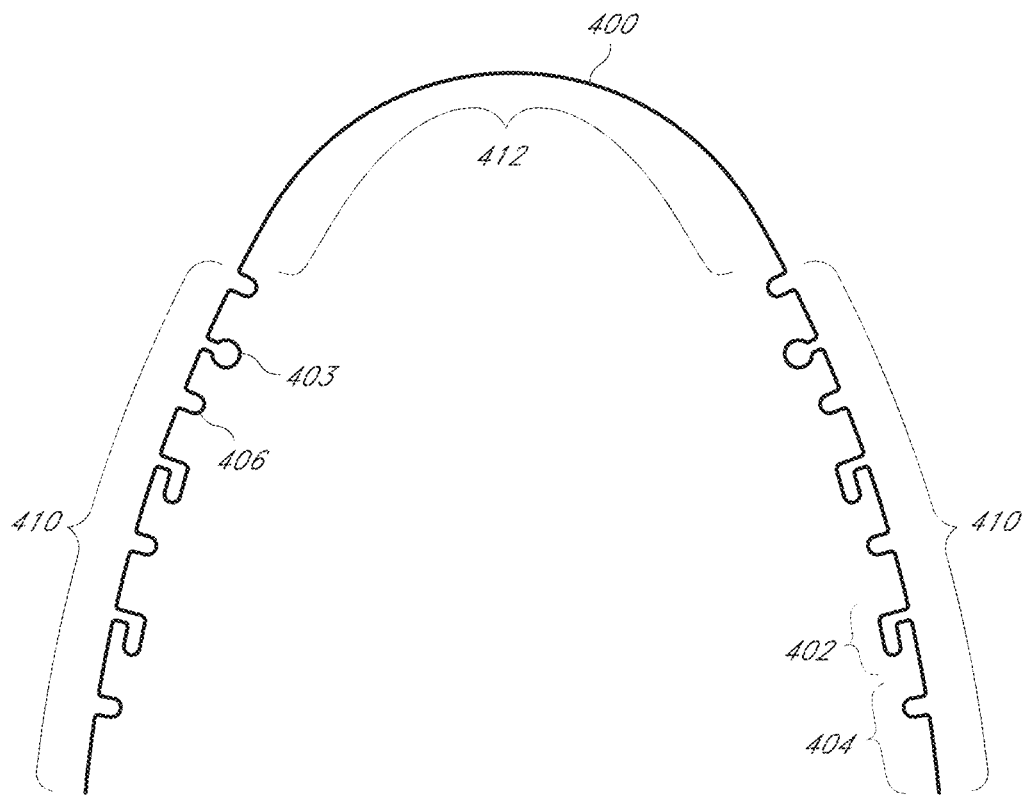
FIG. 4 illustrates an embodiment of a hybrid archwire having two distal sections comprising interproximal bends and male connectors configured for non-sliding mechanics and an intermediate medial section comprising a straight archwire configured for sliding mechanics.

In some embodiments, the hybrid archwire may comprise sections that are configured for sliding mechanics and sections that are configured for non-sliding mechanics. FIG. 4 illustrates an example of a hybrid archwire 400 comprising non-sliding sections 410 and a sliding section 412. As shown in FIG. 4, the non-sliding sections 410 may be configured to positively prevent sliding by using male connectors 406, which may be the same or similar to those described with respect to FIG. 3. The teeth that the non-sliding sections 410 are coupled to may be moved primarily by the forces exerted by interproximal bends 403 positioned between the teeth. In some embodiments, the non-sliding sections 410 may comprise an interproximal bend 403 configured to be positioned between each pair of adjacent teeth within the section and/or between each pair of adjacent orthodontic brackets in the section. In some embodiments, interproximal bends 403 may not be positioned between some pairs of directly adjacent teeth. In some embodiments, subsections within the non-sliding sections 410 may include bracket archwire sections 404 configured to attach to brackets via sliding mechanics (e.g., straight archwire sections), but at least the most distal and most mesial bracket archwire sections 404 may be configured for non-sliding mechanics (e.g., comprise a male connector 406) so that the non-sliding section 410 does not slide as a whole relative to the corresponding set of teeth. In some embodiments, each non-sliding section 410 may comprise zero, one, two, or more than two interproximal bends 403 (e.g., one for each pair of adjacent teeth or one less than the total number of teeth within the section). In some embodiments, the archwire 400 may not be coupled to each tooth in a section. In some implementations, interproximal bends 403 (or inter-bracket bends) may be positioned between adjacent brackets, which may not be positioned on adjacent teeth. In some implementations, interproximal bends 403 may be positioned between two bracket archwire sections 404 configured for sliding mechanics or between one bracket archwire section 404 configured for sliding mechanics and one bracket archwire section 404 configured for non-sliding mechanics. In some embodiments, the sliding section 412 may comprise one or more interproximal bends 403 without male connectors 406. There may be an interproximal bend 403 positioned at the transition between a non-sliding section 410 and a sliding section 412 or the sliding section 410 may extend as a substantially "straight" archwire with a continuous curvature from the adjacent orthodontic bracket in the non-sliding section 410 and be devoid of any interproximal bends 403 and/or male connectors 406. A sliding section 412 between two non-sliding sections 410 may have the same or different configurations on each side of the sliding section 412.

Figure 5:
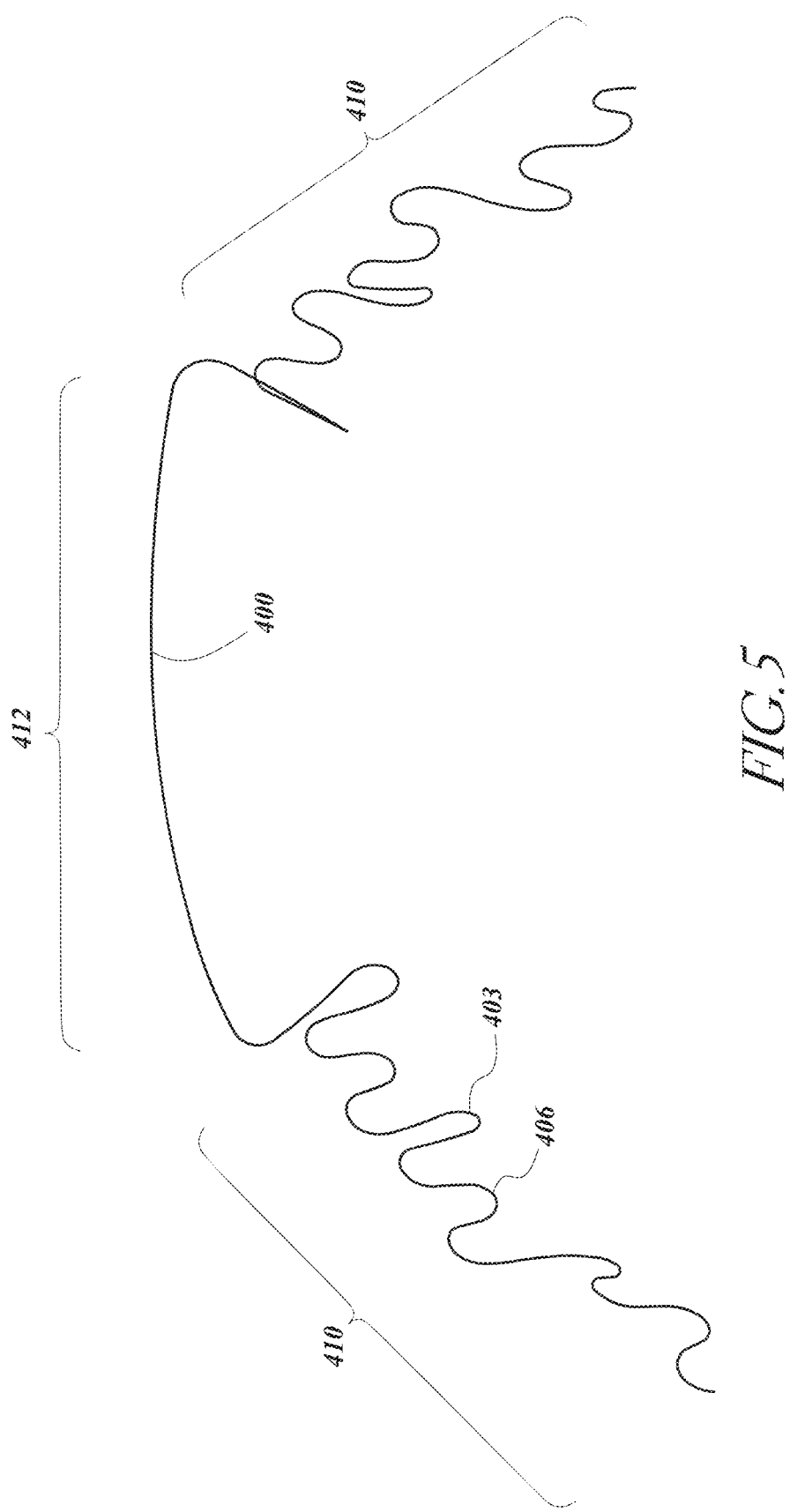
FIG. 5 illustrates an image of another example of a hybrid archwire having two distal sections comprising interproximal bends and male connectors configured for non-sliding mechanics and an intermediate medial section comprising a straight archwire configured for sliding mechanics.

FIG. 5 illustrates an image of another example of a hybrid archwire 400 having two distal sections comprising interproximal bends 403 and male connectors 406 configured for non-sliding mechanics 410 and an intermediate medial section 412 comprising a straight archwire configured for sliding mechanics. As shown in FIG. 5, in some embodiments, the straight portion of the archwire configured for sliding may be relatively offset in a gingival or occlusal direction from the general archwire axis along the non-sliding portions (e.g., the peaks of the bends or the average position of the archwire over a length). The hybrid archwire 400 may include an interproximal bend 403 between the non-sliding sections 410 and the sliding section 412. In some embodiments, the non-sliding sections 412 may comprise a shape memory material (e.g., nitinol or beta-titanium alloys) and the sliding section 412 may comprise a non-shape memory material (e.g., stainless steel).

In other embodiments, the non-sliding section may be defined by bracket archwire sections which are configured to resist sliding relative to the sliding sections. For instance, the non-sliding sections may comprise rectangular cross-sections and/or closely matched sizes relative to the bracket archwire slots and sliding sections may comprise round cross sections and/or loosely matched sizes relative to the bracket archwire slots. The difference in fit may be reflected in a reduced cross-section archwire along the sliding section if the archwire is configured to be used with brackets comprising the same sized and shaped bracket archwire slots throughout both sliding and non-sliding sections. Non-sliding sections may also be created by applying a relatively tacky or non-lubricious coating along the length of those sections that resists sliding and/or by applying a lubricious or sliding-promoting coating along the length of the sliding sections.

In some embodiments, the hybrid archwire 400 may be configured with two distal or posterior non-sliding sections 410 and an intermediate anterior or medial sliding section 412, as illustrated in FIG. 4. The transition between the non-sliding sections 410 and the sliding section 412 may occur anywhere along the dental arch as described elsewhere herein. In some embodiments, the sliding section 412 and non-sliding sections 410 may be switched. In some embodiments, only the left or the right side of the arch may comprise a distal non-sliding section 412 or sliding section 410. Other numbers and locations of non-sliding sections 410 and sliding sections 410 are also contemplated.

A hybrid archwire 400 comprising alternatively sections configured for sliding mechanics and non-sliding mechanics (e.g., fixed non-sliding mechanics) may offer unique advantages. Portions of archwires configure for fixed non-sliding mechanics, particularly those using archwires with shape memory properties, may be designed according to a patient-specific custom profile. The custom archwire can be digitally designed according to digital data representing the positioning of the patient's teeth in a pre-adjusted or initial state (e.g., a state of malocclusion). The positioning of the patient's teeth can then be digitally altered, such as into a preferred or expected final positioning after orthodontic treatment. The orthodontic treatment can then be designed backwards from the expected final positioning. This process allows the opportunity for the doctor and the patient to confer by examining the final expected positioning of the teeth, such as in a computer model. Advantageously, this process allows the patient to provide input into the orthodontic treatment. The patient may visualize the expected result of the orthodontic treatment and evaluate whether the custom-designed treatment meets the patient's desired goals (e.g., esthetic outcome) in addition to allowing the doctor to evaluate his or her clinical goals. This process may help the doctor and patient collaborate to fine-tune the orthodontic treatment. Traditional orthodontic treatments (e.g., pin and tube or edgewise appliances) rely on the doctor adjusting the appliance over a number of orthodontic visits to gradually and continually move the teeth toward the doctor's desired positioning, as evaluated by the doctor during each visit. The patient is unable to participate in the design of the orthodontic treatment.

In some embodiments, disclosed herein is a method of moving teeth. The method can include providing a single continuous customized archwire created from a virtual set-up utilizing image data from a patient's teeth and configured to move the patient's teeth to a pre-determined desired configuration. The single continuous archwire may include a plurality of male structures and a plurality of interproximal structures with respect to the patient's teeth corresponding to a dental arch. Each male loop may correspond to each and every tooth of the dental arch and only a single interproximal looped structure of the plurality of interproximal looped structures may be between each and every male loop corresponding to an interdental space in between each and every tooth of the dental arch when the archwire is in a first configuration. In other embodiments, the archwire could have one, two, or more "straight" sections lacking any male structures and/or interproximal structures as described elsewhere herein. The archwire can then be activated by deflecting the archwire from its first configuration to a second configuration and attaching each male loop of the plurality of male loops to corresponding brackets attached to selected teeth of the dental arch. Activating the archwire can thereby allow the interproximal structures to impart forces on the teeth with respect to the teeth thereby moving the teeth toward the pre-determined desired configuration as the archwire changes from the second configuration back to the first configuration. The archwire may not slide with respect to the brackets in some sections when each of the male structures are attached to the corresponding brackets, but the archwire may slide with respect to other sections.

Custom-formed archwires allow the archwire to be custom-fitted to the individual patient. Even traditional nitinol-based archwires (e.g., straight nitinol archwires), while they may come in several sizes, require forcing an individual dental arch to conform to an archwire of a certain pre-selected size. Custom-formed archwires, such as archwires comprising customized sections of fixed, non-sliding archwire, allow the archwire to be formed to match an infinite number of incremental sizes, which may result in more precise orthodontic treatment and/or less patient discomfort.

Compared to edgewise appliances, portions of archwire relying on fixed, non-sliding mechanics require substantially less force to move the teeth. Edgewise appliances require higher force than are actually necessary to move the teeth in order to overcome friction and slide orthodontic brackets along the archwire. The greater amount of force required for sliding mechanics results in increased patient discomfort, particularly as the archwires must be manually tightened. Because the force applied is an estimate of the force required to move the teeth to a desired position, the orthodontic treatment generally requires a series of over-compensations and under-compensations, wherein the overcompensations result in unnecessarily large and uncomfortable forces. Portions of archwire configured for fixed, non-sliding mechanics can be custom-designed to exert a precise digitally-determined force as needed to move the adjacent teeth, eliminating the need to exert excess pressure along that section of the archwire.

Portions of archwire configured for sliding mechanics are advantageous in that they allow the doctor to very precisely fine-tune the orthodontic treatment along that section of the archwire without replacing the archwire. Thus, fine adjustments can be made without the time or cost of obtaining new digital records of the positioning of the teeth, without digitally remodeling the teeth, and/or without fabricating a new custom archwire. The adjustments which may be made to the sliding portion of the archwire, may include, for example, making and/or altering first order and/or second order bends, particularly when the sliding portion 412 is fabricated from non-shape memory material (e.g., stainless steel), or any other known adjustments that are commonly made to orthodontic appliances that employ sliding mechanics. Portions of archwire which may be most conducive for sliding mechanics may be configured for moving areas of teeth which are most visible and/or sensitive to a patient's esthetic goals, such as the front teeth for example. In some embodiments, the archwire 400 may comprise sections 412 configured for non-sliding mechanics along the posterior teeth and a section configured for sliding mechanics along the most visible anterior teeth, such as shown in FIGS. 4 and 5. Such configurations may provide the advantageous discussed elsewhere herein, including reduced overall application of force from the archwire, customized archwire sizing, customized orthodontic treatment plans using digital expected positioning, and/or reduced number of orthodontic visits, while allowing very fine adjustments of select teeth. The non-sliding mechanics on the left and/or right sides of a section of archwire configured for sliding mechanics may still be configured to move the section of teeth along the sliding section according to a predetermined custom (e.g., digitally-defined) plan, but the sliding mechanics along that section may allow for slight variations or deviations from that plan, particularly with respect to the positioning of the individual teeth in that section relative to one another. The fine adjusting may be performed near the very end of the orthodontic treatment, minimizing the total number of visits. The fine adjusting may be performed to accommodate specific patient preferences that the patient may develop as the orthodontic treatment progresses and the patient is able to visually evaluate the results.

Various other modifications, adaptations, and alternative designs are of course possible in light of the above teachings, including but not limited to by mixing any cross-section shape, size (e.g., diameter, length, width, or thickness), and/or material in the bracket-archwire and interproximal archwire sections. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "accessing an orthodontic appliance" includes "instructing the accessing of an orthodontic appliance." The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. An archwire for orthodontic treatment, the archwire comprising:
   a first anterior section configured to be disposed within slots of a first plurality of orthodontic brackets disposed on anterior teeth of a patient and to slide relative to the first plurality of orthodontic brackets to move anterior teeth with sliding mechanics, the first anterior section comprising a loop with a mesial portion and a distal portion, wherein the mesial portion is straight and oriented in an occlusal-gingival direction and the distal portion is curved; and
   two posterior second sections disposed on opposing sides of the first anterior section, the two posterior second sections comprising a plurality of connectors and a plurality of interproximal loops, the plurality of connectors configured to couple with a second plurality of orthodontic brackets disposed on posterior teeth of the patient to prevent sliding in a mesial-distal direction, wherein at least one interproximal loop of the plurality of interproximal loops is disposed between adjacent connectors of the plurality of connectors and configured to move the posterior teeth with non-sliding mechanics.

2. The archwire of claim 1, wherein the loop is configured to be disposed between adjacent orthodontic brackets of the first plurality of orthodontic brackets.

3. The archwire of claim 1, wherein the first anterior section comprises a first cross-sectional shape and the two posterior second sections comprise second cross-sectional shapes different than the first cross-sectional shape.

4. The archwire of claim 1, wherein a thickness of the two posterior second sections is larger than the first anterior section.

5. The archwire of claim 1, wherein the distal portion curves distally.

6. The archwire of claim 1, further comprising a shape memory material.

7. An archwire for orthodontic treatment, the archwire comprising:
   a first anterior section configured to be disposed within slots of a first plurality of orthodontic brackets disposed on anterior teeth of a patient and to slide relative to the first plurality of orthodontic brackets to move anterior teeth with sliding mechanics; and two posterior second sections disposed on opposing sides of the first anterior section, the two posterior second sections comprising a plurality of connectors and a plurality of interproximal loops, the plurality of connectors configured to couple with a second plurality of orthodontic brackets disposed on posterior teeth of the patient to prevent sliding in a mesial-distal direction, wherein at least one interproximal loop of the plurality of interproximal loops is disposed between adjacent connectors of the plurality of connectors and configured to move the posterior teeth with non-sliding mechanics.

8. The archwire of claim 7, wherein the first anterior section comprises a loop.

9. The archwire of claim 8, wherein the loop is configured to be disposed between adjacent orthodontic brackets of the first plurality of orthodontic brackets.

10. The archwire of claim 9, wherein the first anterior section comprises a first cross-sectional shape and the two posterior second sections comprise second cross-sectional shapes different than the first cross-sectional shape.

11. The archwire of claim 8, wherein a thickness of the two posterior second sections is larger than the first anterior section.

12. The archwire of claim 8, wherein the loop comprises a mesial portion and a distal portion, wherein the mesial portion is straight and oriented in an occlusal-gingival direction.

13. The archwire of claim 12, wherein the distal portion curves distally.

14. The archwire of claim 7, further comprising a shape memory material.

15. An archwire for orthodontic treatment, the archwire comprising:

a first anterior section configured to be disposed within slots of a first plurality of orthodontic brackets disposed on anterior teeth of a patient and to slide relative to the first plurality of orthodontic brackets to move anterior teeth with sliding mechanics; and two posterior second sections disposed on opposing sides of the first anterior section, the two posterior second sections comprising a plurality of connectors and a plurality of interproximal loops, the plurality of connectors configured to couple with a second plurality of orthodontic brackets disposed on posterior teeth of the patient to prevent sliding in a mesial-distal direction, wherein at least one interproximal loop of the plurality of interproximal loops is disposed between adjacent connectors of the plurality of connectors and configured to move the posterior teeth with non-sliding mechanics, wherein a thickness of the two posterior second sections is larger than the first anterior section.

16. The archwire of claim 15, wherein the first anterior section comprises a loop.

17. The archwire of claim 16, wherein the loop comprises a mesial portion and a distal portion, wherein the mesial portion is straight and oriented in an occlusal-gingival direction.

18. The archwire of claim 17, wherein the distal portion curves distally.

19. The archwire of claim 18, further comprising a shape memory material.

20. The archwire of claim 18, wherein the first anterior section is devoid of connectors.

* * * * *